United States Patent [19]
Neukermans et al.

[11] Patent Number: 6,122,394
[45] Date of Patent: *Sep. 19, 2000

[54] COMPACT, SIMPLE, 2D RASTER, IMAGE-BUILDING FINGERPRINT SCANNER

[75] Inventors: Armand P. Neukermans, Palo Alto; Timothy G. Slater, San Francisco; Philip Downing, Saratoga, all of Calif.

[73] Assignee: Xros, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/846,837

[22] Filed: May 1, 1997

Related U.S. Application Data

[60] Provisional application No. 60/016,346, May 1, 1996.

[51] Int. Cl.[7] .................................................. G06K 9/00
[52] U.S. Cl. ............................ 382/124; 382/127; 356/71; 359/196
[58] Field of Search ................................. 382/124, 126, 382/212, 125, 127, 115, 116, 181, 120; 340/146, 71; 356/168, 165, 167; 359/196

[56] References Cited

U.S. PATENT DOCUMENTS

| | | | |
|---|---|---|---|
| 4,053,228 | 10/1977 | Schiller | 356/71 |
| 4,120,585 | 10/1978 | DePalma et al. | 356/71 |
| 4,152,056 | 5/1979 | Fowler | 354/62 |
| 4,358,677 | 11/1982 | Ruell et al. | 356/71 |
| 4,385,831 | 5/1983 | Ruell | 356/71 |
| 4,537,484 | 8/1985 | Fowler et al. | 354/62 |
| 4,568,178 | 2/1986 | Rios | 355/40 |
| 4,924,085 | 5/1990 | Kato et al. | 250/227.28 |
| 4,925,300 | 5/1990 | Rachlin | 356/71 |
| 5,067,162 | 11/1991 | Driscoll et al. | 382/5 |
| 5,088,817 | 2/1992 | Igaki et al. | 356/71 |
| 5,109,427 | 4/1992 | Yang | 382/4 |
| 5,187,748 | 2/1993 | Lee | 382/31 |
| 5,197,475 | 3/1993 | Antich et al. | |
| 5,456,256 | 10/1995 | Schneider et al. | 600/445 |
| 5,546,471 | 8/1996 | Merjanian | 382/124 |
| 5,548,394 | 8/1996 | Giles et al. | 356/71 |
| 5,587,533 | 12/1996 | Schneider et al. | 73/614 |
| 5,596,454 | 1/1997 | Hebert | 359/726 |
| 5,629,790 | 5/1997 | Neukermans et al. | 359/196 |
| 5,796,858 | 8/1998 | Zhou et al. | 382/127 |
| 5,963,657 | 8/1998 | Bowker et al. | 382/115 |

Primary Examiner—Bhavesh Mehta
Assistant Examiner—Sheela Chawan
Attorney, Agent, or Firm—Donald E. Schreiber

[57] ABSTRACT

A beam (38) of electromagnetic radiation deflected by a moving mirror plate (56) of a micromachined scanner (54) produces a two dimensional ("2D") raster (132) on a scanned surface (28) of a block (34). The block (34) is transparent to electro-magnetic radiation of pre-established wavelengths. A radiation inlet-face (36) of the block (34) admits the beam (38) that then impinges on the scanned surface (28) to exit the block (34) through a radiation outlet-face (42). After exiting the block (34), the beam (38) impinges upon a radiation detector (142). Total internal reflection ("TIR") of the beam (38) from the scanned surface (28) at fingerprint valleys and frustration of TIR at fingerprint ridges causes the radiation detector (142) to produce a time-varying electrical signal that represents the fingerprint. The scanned surface (28) may be formed by a patch (302) of resilient material, that may be tinted to be transparent only at the pre-established wavelength of the electro-magnetic radiation.

25 Claims, 12 Drawing Sheets

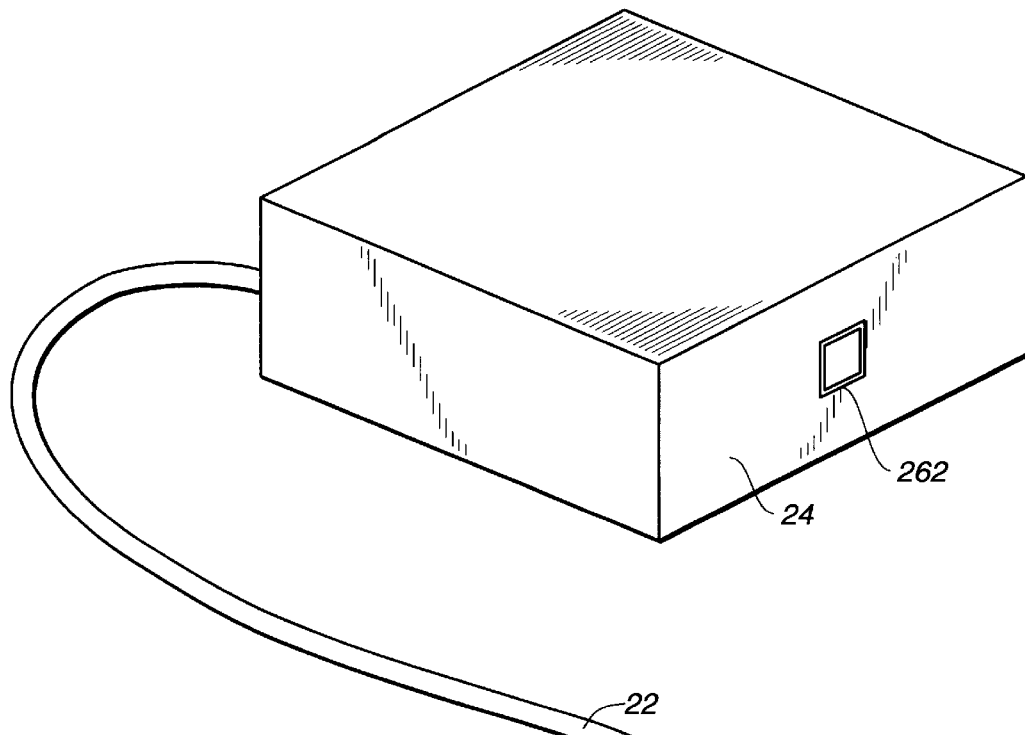
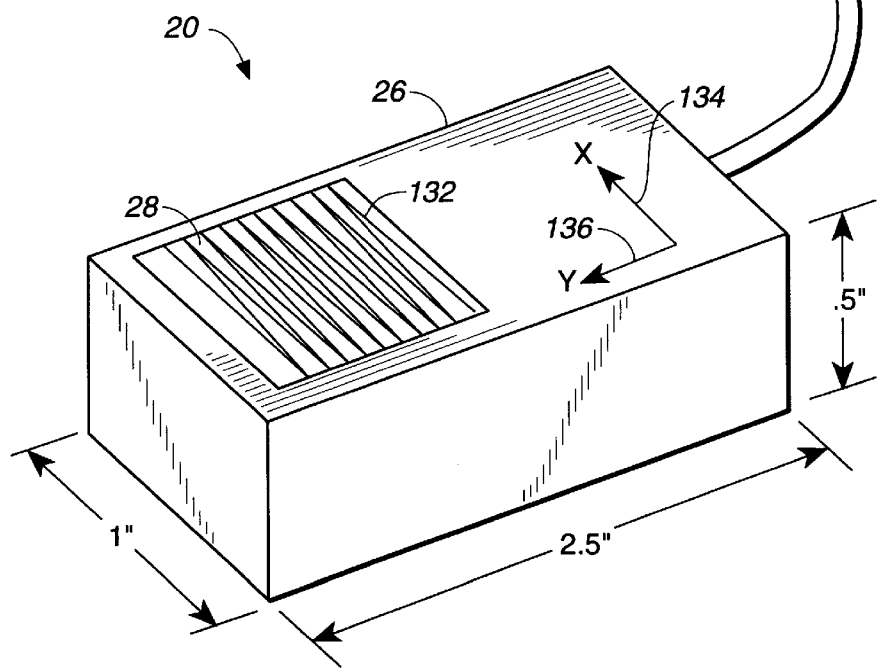
FIG._1

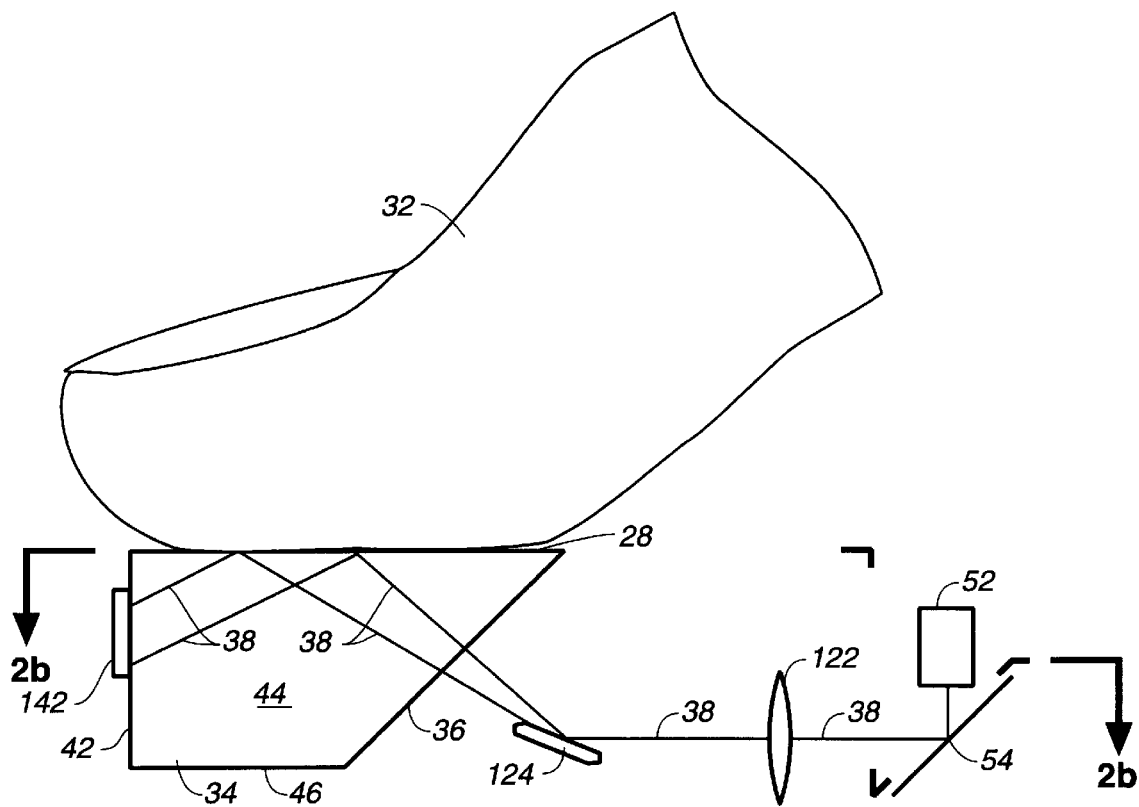
FIG._2a
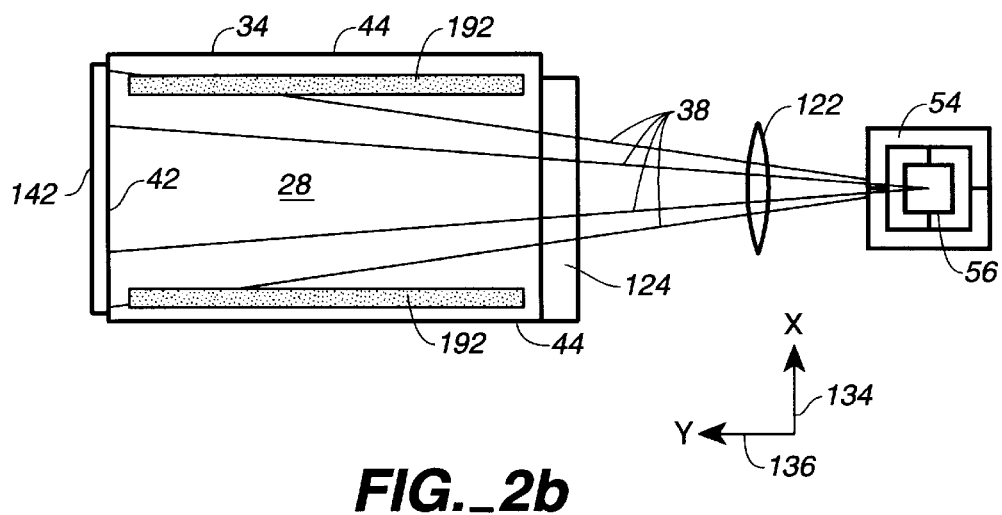
FIG._2b

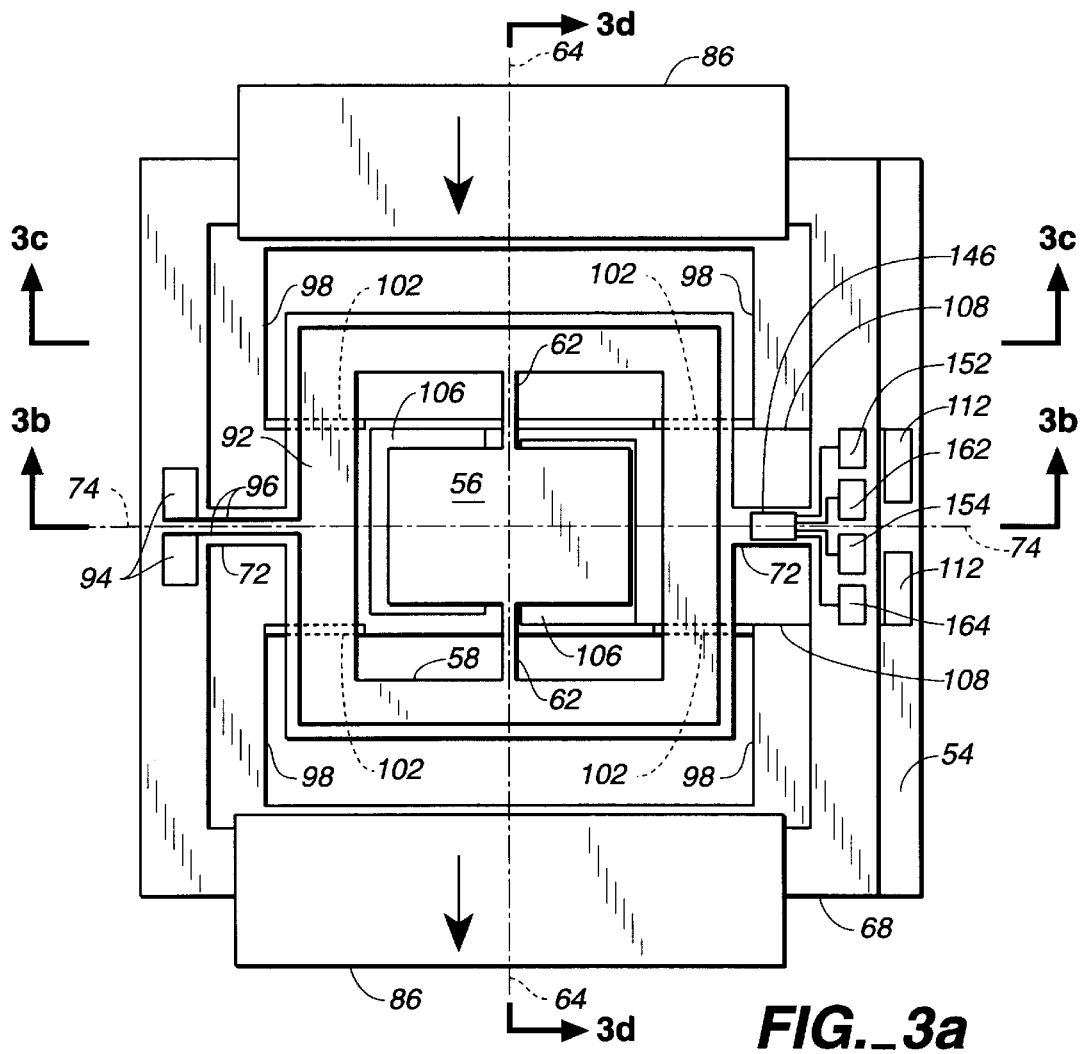
FIG._3a
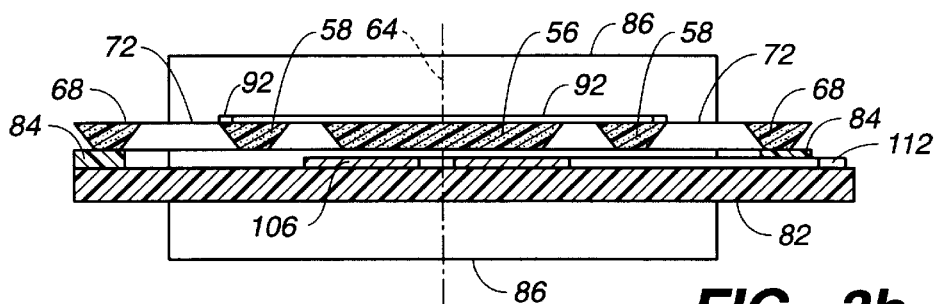
FIG._3b
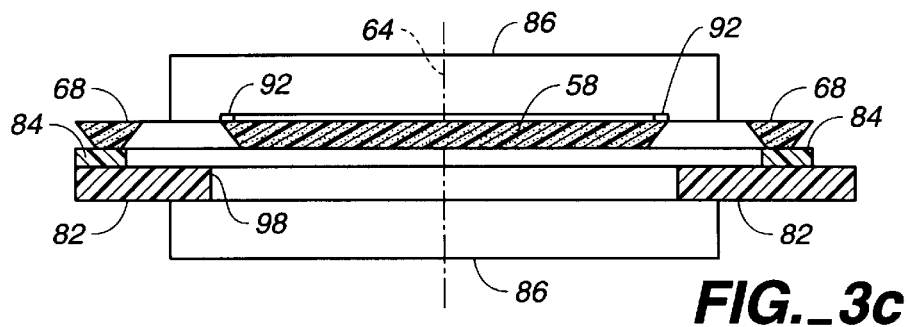
FIG._3c

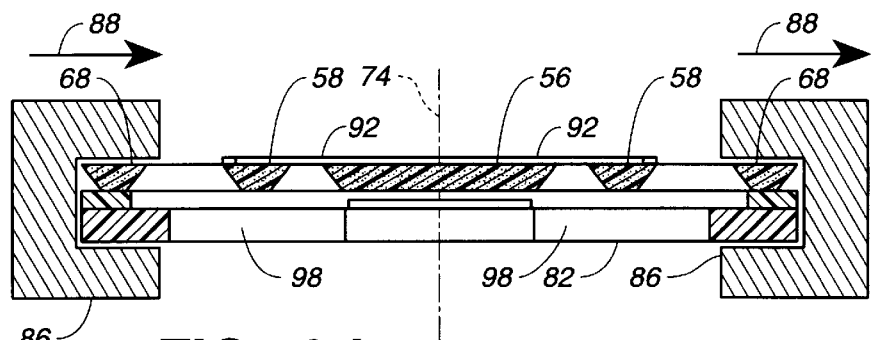
FIG._3d
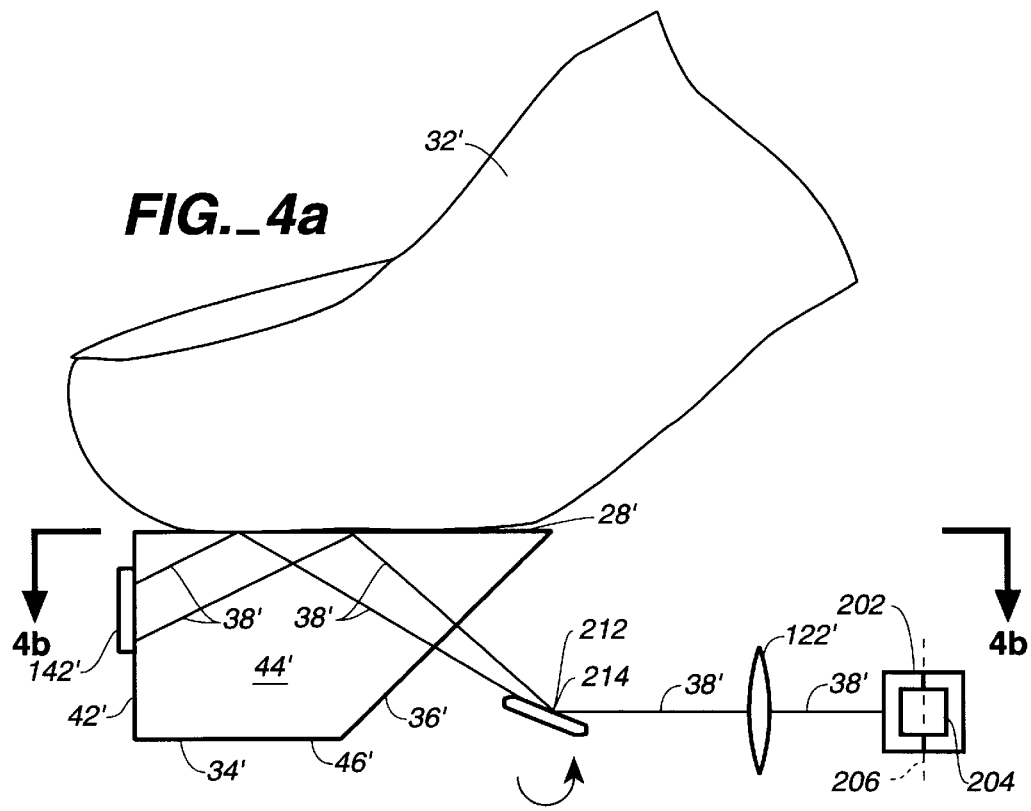
FIG._4a
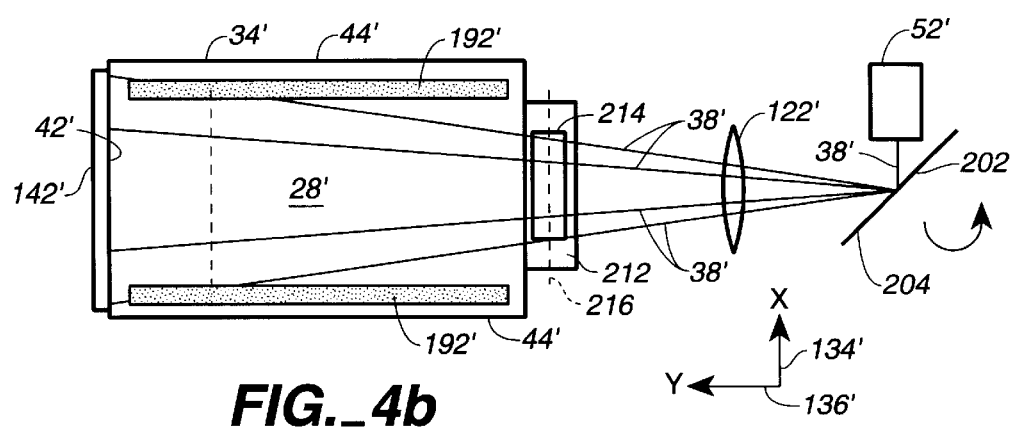
FIG._4b

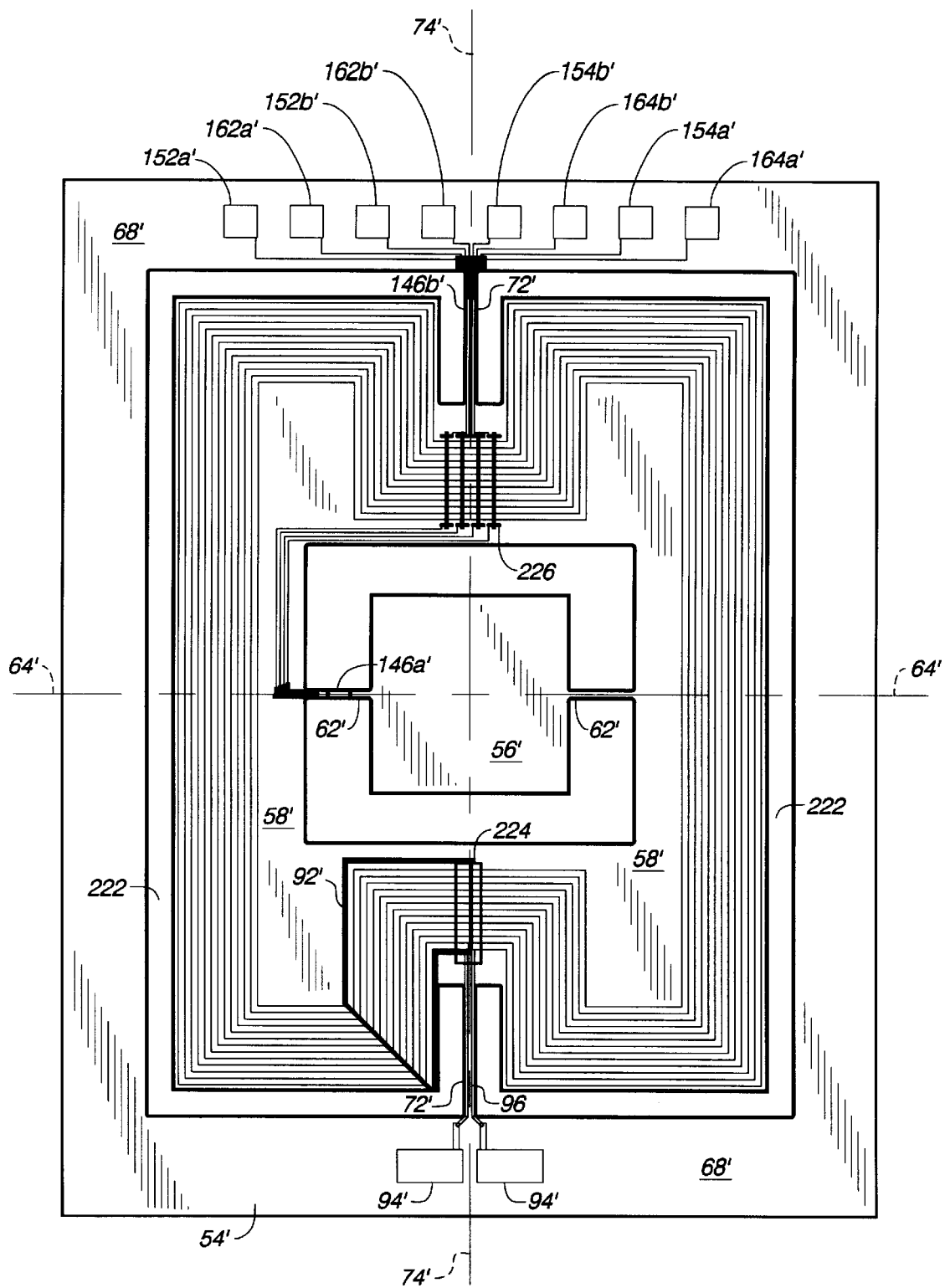
FIG._5

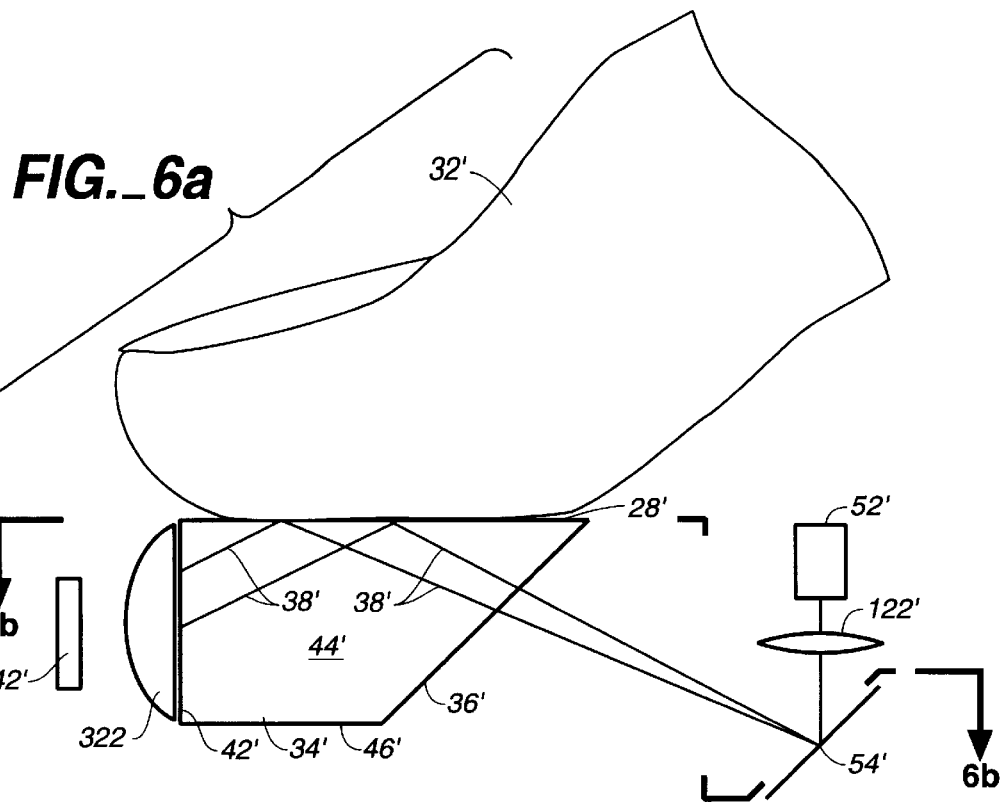
FIG._6a
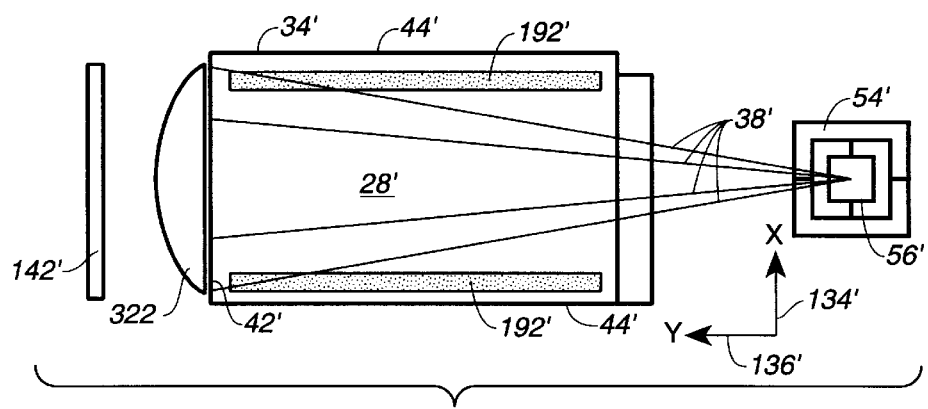
FIG._6b
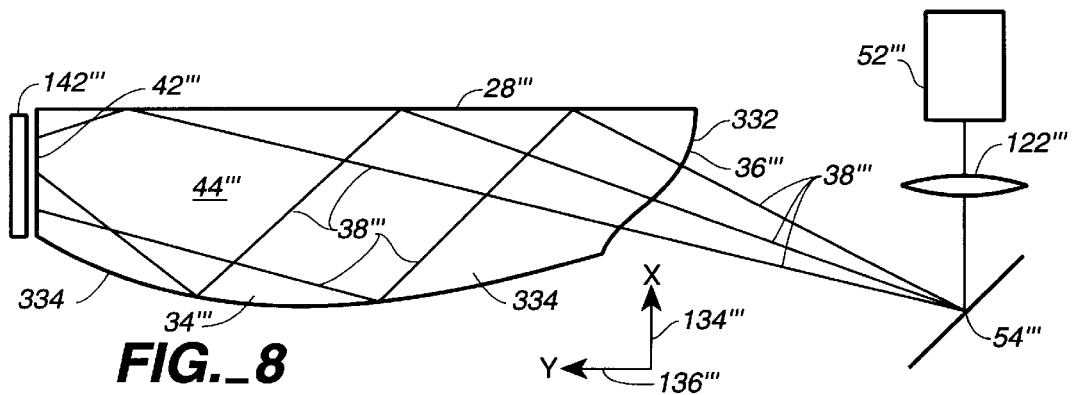
FIG._8

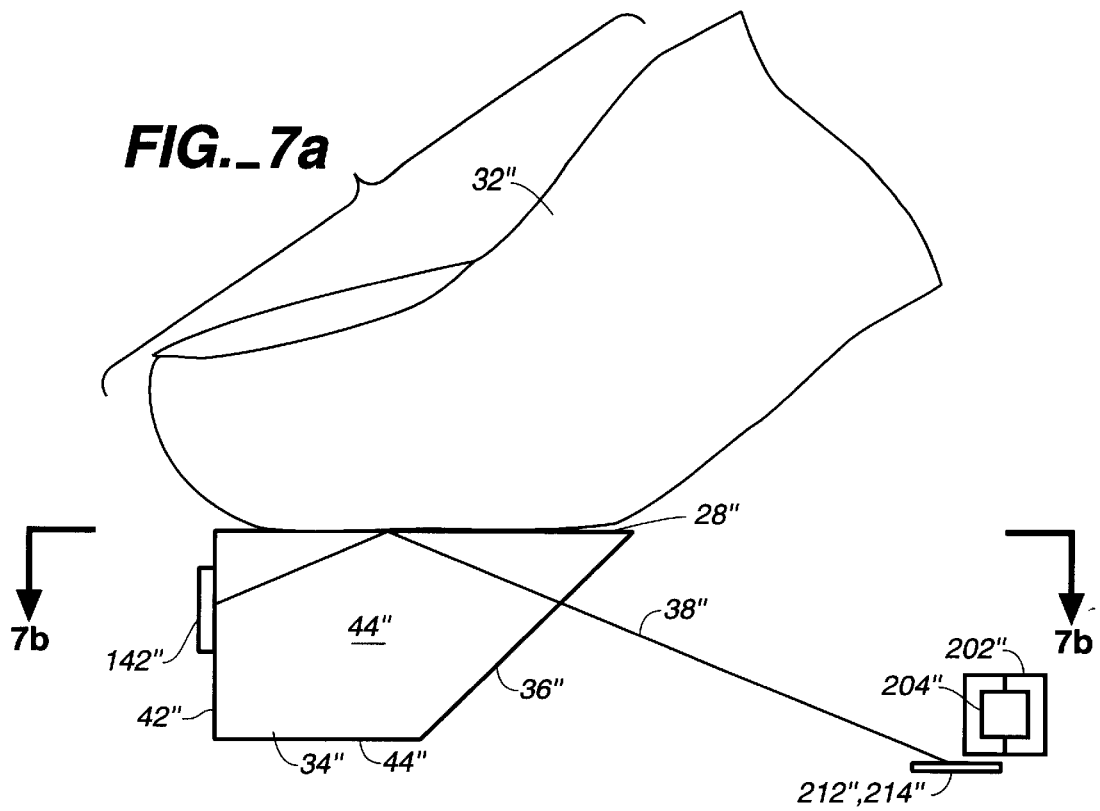
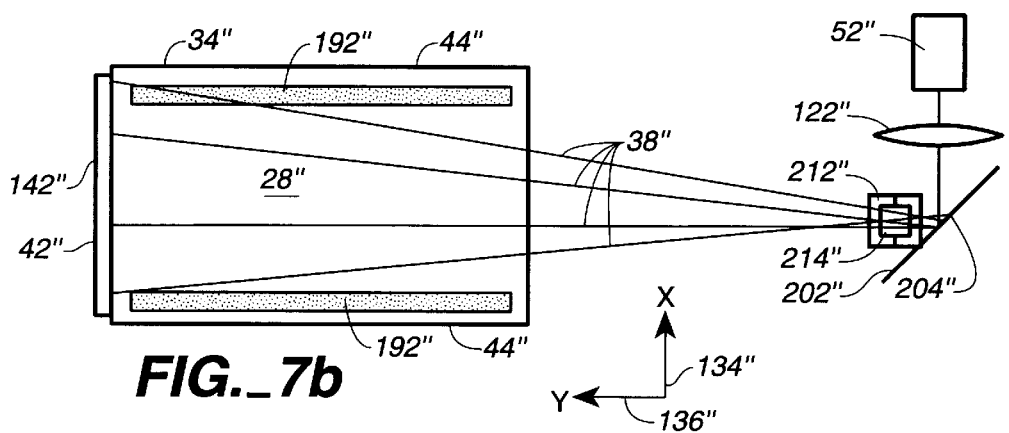
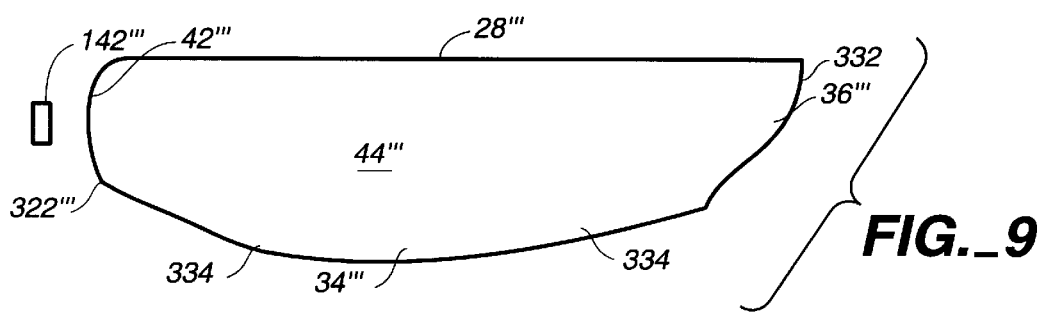

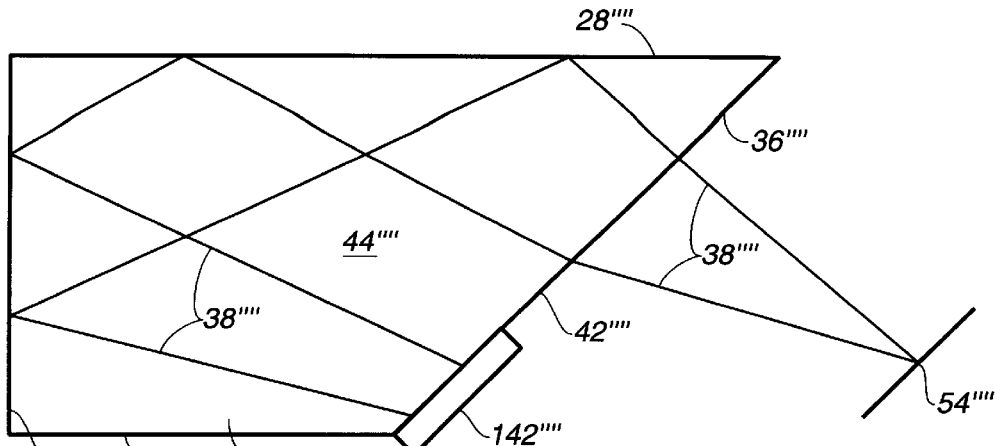
FIG._10
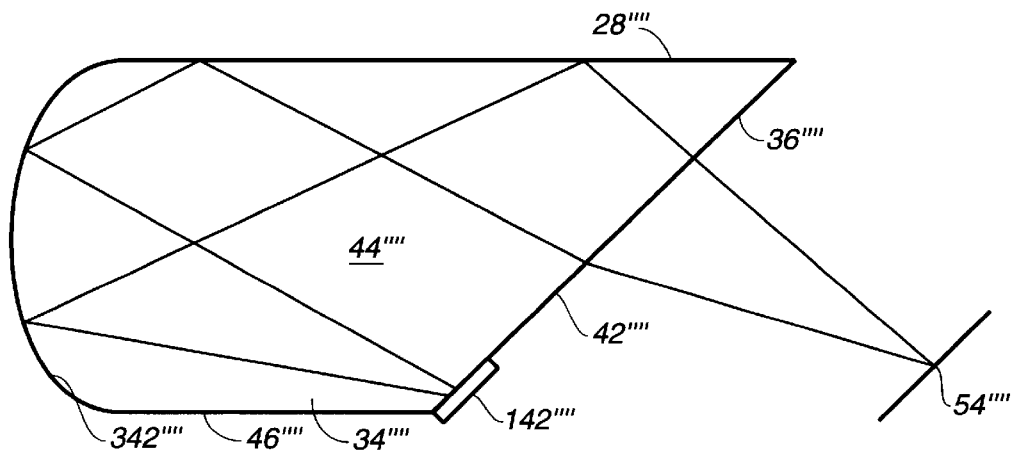
FIG._11
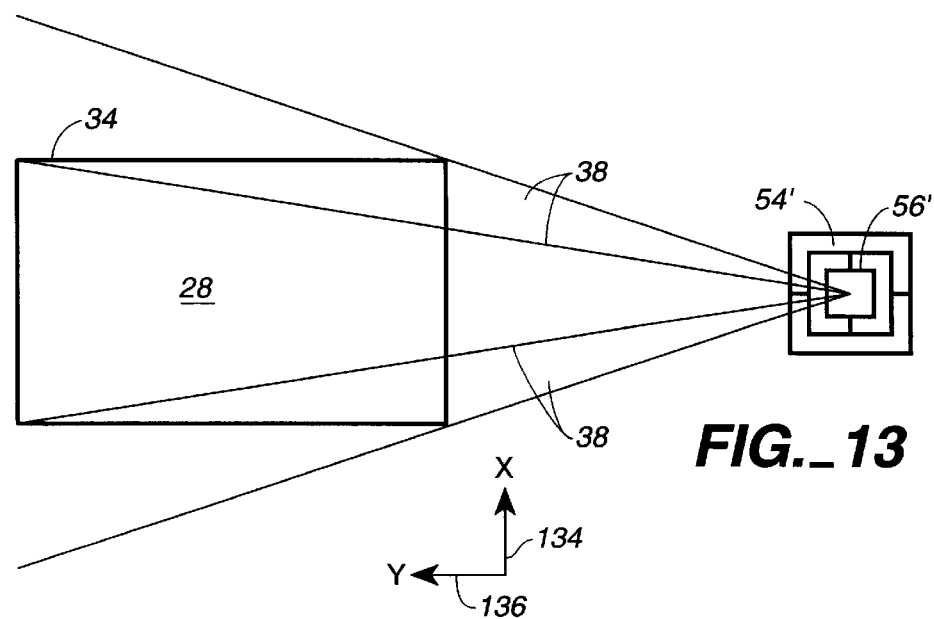
FIG._13

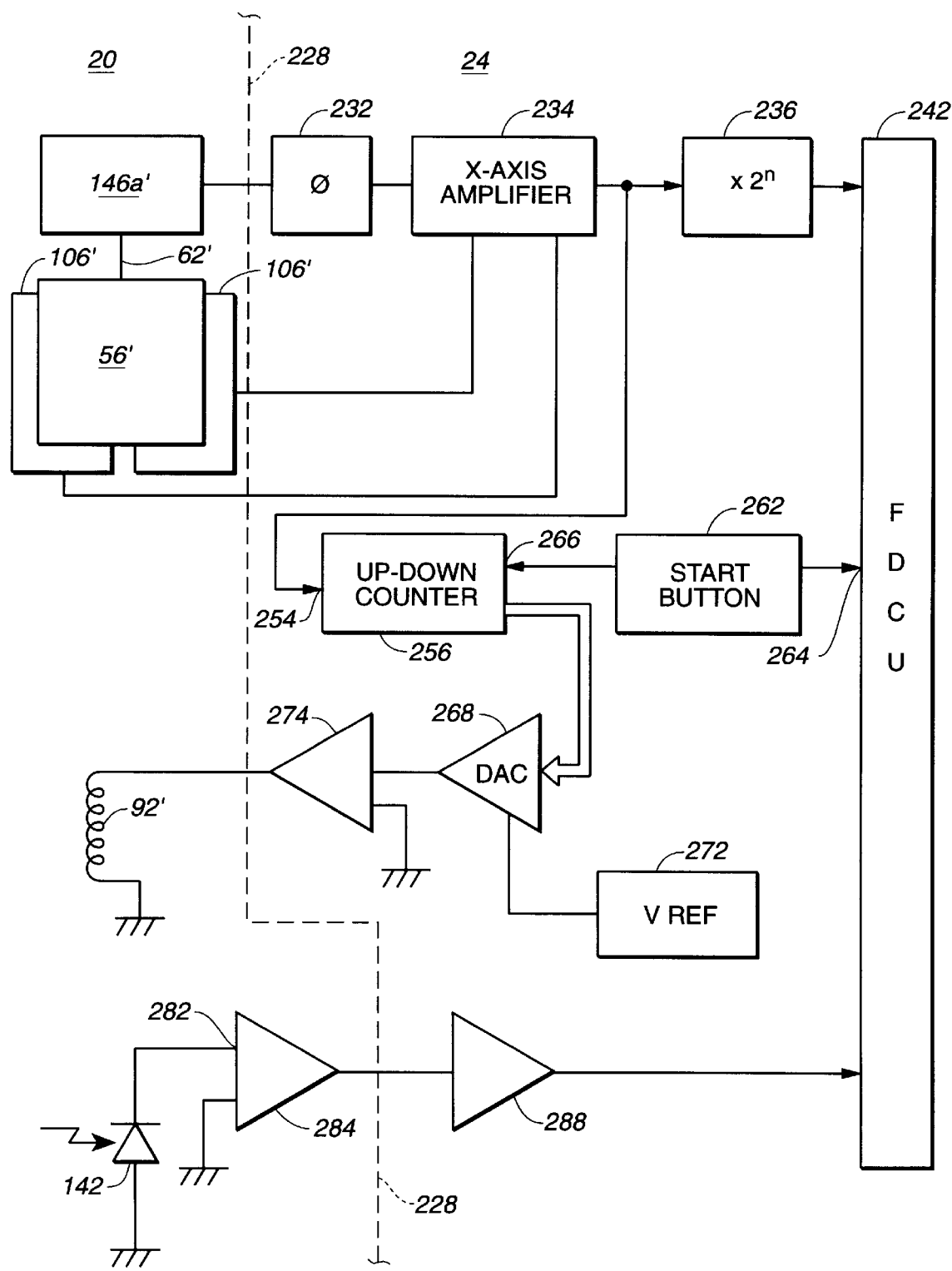
FIG._12

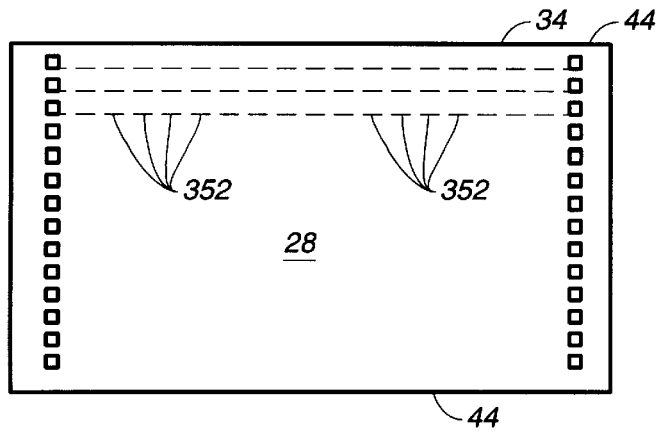
FIG._14
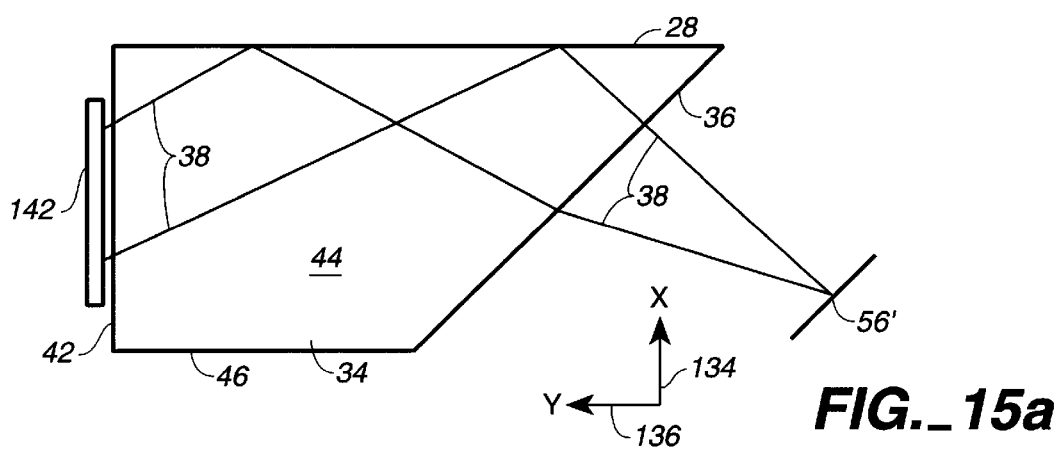
FIG._15a
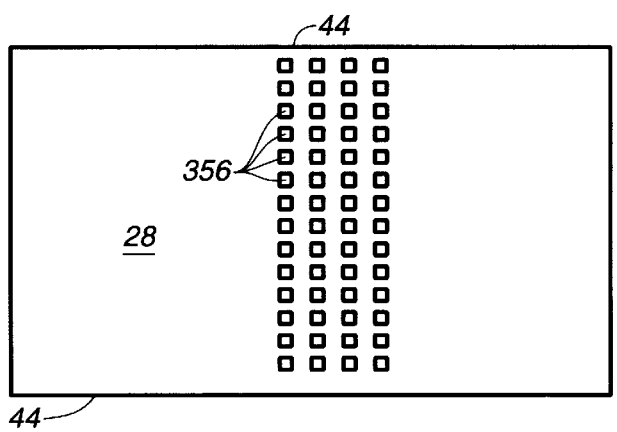
FIG._15b
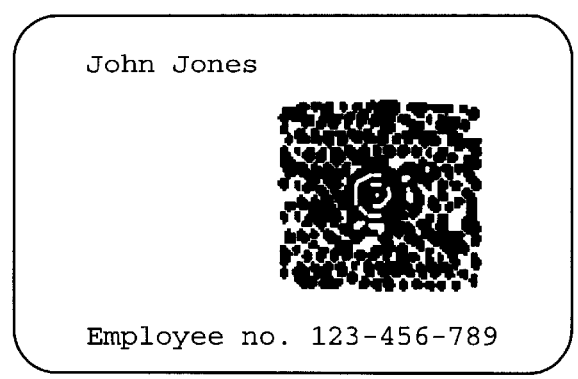
FIG._19

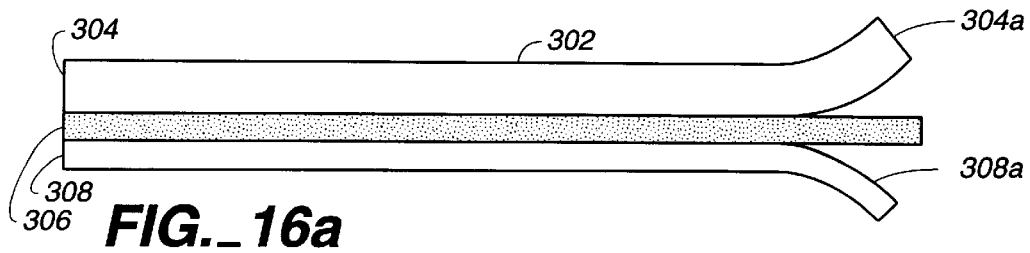
FIG._16a
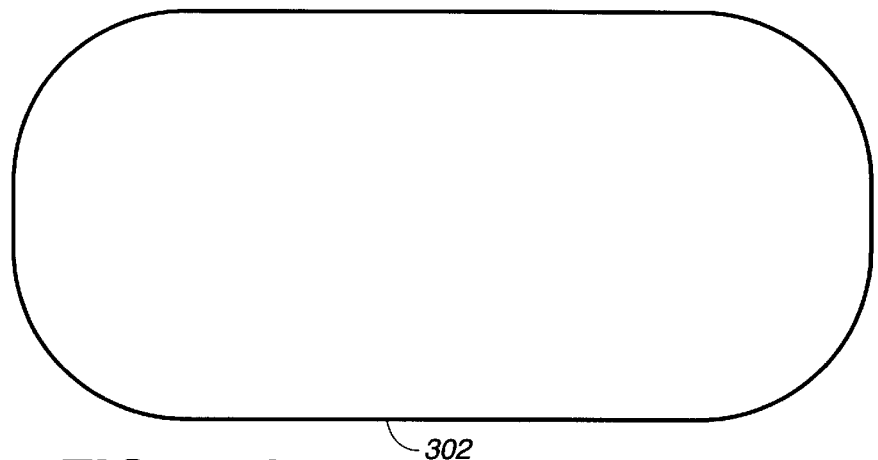
FIG._16b
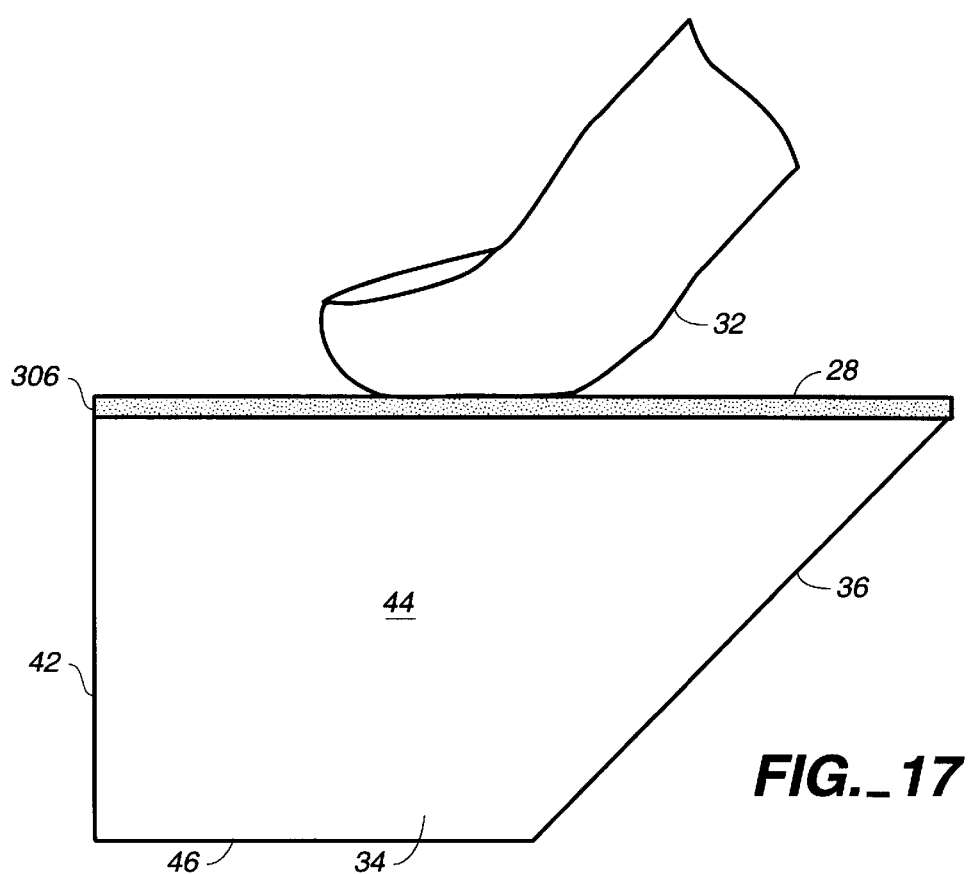
FIG._17

FIG._18a
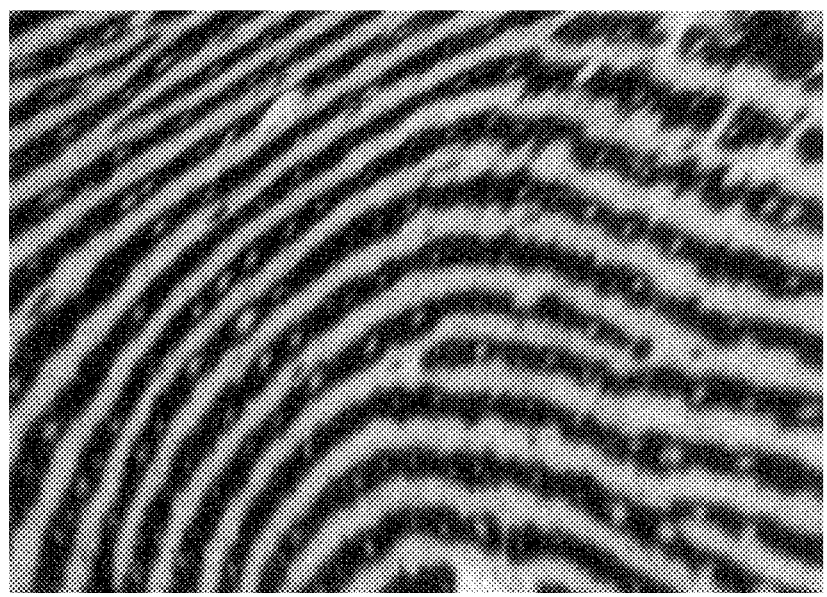
FIG._18b

COMPACT, SIMPLE, 2D RASTER, IMAGE-BUILDING FINGERPRINT SCANNER

CROSS REFERENCE TO RELATED APPLICATION

This patent is a Continuation-in-part of U.S. Pat. No. 5,629,790 that issued May 13, 1997.

CLAIM OF PROVISIONAL APPLICATION RIGHTS

This application claims the benefit of:

U.S. Provisional Patent Application Ser. No. 60/016,346 filed on May 1, 1996; and a Provisional Patent Application entitled "Replaceable Protective Cover for a Finger Print Scanner" that was filed with the United States Patent and Trademark Office ("USPTO") on or after Mar. 21, 1997, for which the applicants have not yet received a filing receipt from the USPTO.

BACKGROUND OF THE INVENTION

1. Field of the Invention

The present invention relates generally to the technical field of optical scanning and, more particularly, to fingerprint scanners used for personal verification and/or identification.

2. Description of the Prior Art

Biometric identification techniques, e.g. fingerprints and mug shots, have been employed for many years in the criminal justice system for identifying individuals. For example, financial institutions in several states have begun or are launching programs that require fingerprinting non-customers wishing to cash a check at a teller window. The financial institutions estimate that such fingerprinting will reduce check fraud 40% to 60%. To reduce losses from fraud, commercial enterprises are presently investigating various biometric identification systems to reduce fraud. Different biometric identification systems that are now in use or being tested by financial institutions use various biometric characteristics such as signature dynamics, hand geometry, fingerprints, retina scans, iris scans, or voice recognition, to identify or verify an individual's identity.

While traditional financial transaction systems experience losses from fraud such as those outlined above, emerging electronic commercial systems, such as the global computer information network known as the Internet, are far less secure than the traditional systems. Obviously the potential for fraud in these emerging electronic commercial systems exceeds that of traditional systems. Truly secure communication via the Internet, especially for financial transactions or for gaining access to an intra-company network, frequently require that the sender or requester be identified beyond a reasonable doubt. Since computer user-IDs and passwords are easily compromised, truly secure electronic communication necessarily requires information in addition to merely the user-ID and password.

To address the user verification problem both for traditional and electronic commerce, a number of fingerprint identification systems have recently been introduced that, using a personal computer, identify an individual. For example, a major keyboard manufacturer has recently announced a keyboard that includes a fingerprint imaging system. This particular product uses a CCD imaging device and conventional optics to capture the fingerprint image. Unfortunately, present systems for capturing fingerprint data, and as well as other competing biometric identification systems, are all too expensive to permit widespread dissemination, such as at every point of sale terminal and/or automatic teller machine terminal. Consequently, unless the cost of biometric identification systems decrease greatly, their widespread use in the immediate future to reduce financial transaction fraud appears unlikely.

Another application for biometric identification that requires widespread dissemination of biometric sensors exists for expensive portable devices such as laptop and notebook computers. In recent years, thefts of laptop and notebook computers have increased markedly due to small size of laptop and notebook computers and their comparatively high market value, e.g. $2,000.00 to $7,000.00. However, such a market value for a laptop or notebook computer is, in many instances, only a small fraction of the true economic damage caused by its theft due to a concurrent loss of valuable information that its owner has stored in the computer. If a portable device such as a laptop or notebook computer were trainable to biometrically recognize its owner and to operate only after biometrically confirming the user's identity, a stolen laptop or notebook computer would be worthless. However, a biometric sensor suitable for use in a laptop or notebook computer, or other portable device such as a cellular telephone, must occupy a minuscule amount of space. Consequently, widespread adoption of biometric identification to deter theft or illicit use of portable electronic devices such as laptop and notebook computers and cellular telephones requires not only an inexpensive biometric sensor, it also requires an extremely compact biometric sensor.

Present fingerprint scanners generally employ an optical platen to which a subject touches a finger while the scanner acquires the fingerprint data. If the optical platen gets scratched or contaminated, then it might require replacement. Furthermore, structural materials used in fabricating the optical platen, such as glass or polymeric materials, are generally not compliant, and therefore acquiring accurate fingerprint data requires that the subject press the finger forcefully against the optical platen.

SUMMARY OF THE INVENTION

An object of the present invention is to provide a low-cost fingerprint scanner that may be used for biometrically identifying individuals.

Another object of the present invention is to provide an extremely compact fingerprint scanner that may be used for biometrically identifying individuals.

Another object of the present invention is to provide a fingerprint scanner that may be used for biometrically identifying individuals having finer resolution than present fingerprint scanners.

Another object of the present invention is to provide a fingerprint scanner that may be used for biometrically identifying individuals having better optical performance than present fingerprint scanners.

Yet another object of the present invention is to provide a fingerprint scanner that is inexpensive, rugged, easy to manufacture, easy to maintain, and economical to manufacture.

Briefly, the present invention is a compact, simplified, high performance two dimensional ("2D") fingerprint scanner in which the finger does not move, and a beam scans the whole fingerprint sequentially in raster fashion. The 2D scanner generates a time-varying electrical signal that represents a fingerprint of a human subject. The scanner includes a block that is transparent to electro-magnetic radiation of a pre-established wavelength or range of wavelengths. The block includes a scanned surface that the human subject touches with a finger for which a representation of the fingerprint is to be generated. The block also includes a radiation inlet-face for admitting into the block a beam of electro-magnetic radiation having the pre-established wavelength or range of wavelengths. The block further includes a radiation outlet-face through which exits from the block at least a portion of electro-magnetic radiation admitted into the block through the radiation inlet-face. The radiation inlet-face and the radiation outlet-face of the block being distinct from the scanned surface thereof. The block's shape causes the beam of electro-magnetic radiation entering through the radiation inlet-face to impinge upon the scanned surface of the block before exiting from the block through the radiation outlet-face.

The scanner of the present invention also includes a radiation source for emitting a beam of electro-magnetic radiation having the pre-established wavelength or range of wavelengths. A scanning means included in the scanner receives the beam of electro-magnetic radiation emitted by the radiation source, and simultaneously deflects the beam along two axes to form a 2D raster of the beam. The 2D raster is then emitted from the scanning means to be directed into the block through the radiation inlet-face thereof. In this way the radiation source and the scanning means cause a 2D raster formed by the beam to impinge upon the scanned surface of the block. In a preferred embodiment, the scanning means uses a combination of electrostatic and magnetic drive to produce a very compact, sturdy and inexpensive fingerprint scanner.

The scanner further includes a radiation detector which receives electro-magnetic radiation admitted into the block through the radiation inlet-face thereof, impinges upon the scanned surface of the block, and exits from the block through the radiation outlet-face thereof. The radiation detector is responsive to the received electro-magnetic radiation for producing the time-varying electrical signal that represents the fingerprint of the human subject's finger then touching the scanned surface of the block.

Another improvement in the fingerprint scanner of the present invention is a resilient material forming the scanned surface touched by the human subject's finger. Preferably, the resilient material is formed by a patch secured to the block for providing the scanned surface of said block touched by the human subject's finger. It appears advantageous to tint the resilient surface to be transparent to electro-magnetic radiation at the pre-established wavelength or range of wavelengths, and to be less transparent to electro-magnetic radiation at wavelengths other than the pre-established wavelength or range of wavelengths.

Another advantage of the present invention is that, not only is it less expensive and smaller than other optical fingerprint scanners as well as virtually all other biometric identification systems that compete with fingerprint identification, the present invention can, without a significant increase in cost, provide finer resolution than that of competing optical fingerprint scanners.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a perspective view illustrating a fingerprint scanner in accordance with the present invention that includes an outer housing which encloses all the scanner's components, and that is coupled by a cable to a controller of the scanner's operation;

FIG. 2a is an elevational view depicting optical elements included in the fingerprint scanner illustrated in FIG. 1 including a total internal reflection block having a scanned surface, and various different paths by which a beam of light passes through the optical elements;

FIG. 2b is a plan view taken along the line 2b—2b in FIG. 2a that also illustrates various different paths by which a beam of light passes through the optical elements;

FIG. 3a is a plan view of a 2D scanner micromachined from silicon adapted for use in the fingerprint scanner depicted in FIGS. 1, 2a and 2b for deflecting the beam of light to form a 2D raster;

FIG. 3b is a cross-sectional elevational view of the 2D micromachined scanner taken along the line 3b—3b of FIG. 3a;

FIG. 3c is a cross-sectional elevational view of the 2D micromachined scanner taken along the line 3c—3c of FIG. 3a;

FIG. 3d is a cross-sectional elevational view of the 2D micromachined scanner taken along the line 3d—3d of FIG. 3a;

FIG. 4a is an elevational view depicting optical elements included in an alternative embodiment of the fingerprint scanner illustrated in FIGS. 2a and 2b;

FIG. 4b is a plan view taken along the line 4b—4b in FIG. 4a that also illustrates various different paths by which a beam of light passes through the alternative embodiment fingerprint scanner;

FIG. 5 is a plan view of the presently preferred embodiment of a 2D scanner micromachined from silicon for use in the fingerprint scanner depicted in FIGS. 1, 2a and 2b for deflecting the beam of light to form a 2D raster;

FIG. 6a is an elevational view depicting a preferred arrangement for optical elements included in the fingerprint scanner illustrated in FIGS. 1, 2a and 2b, and various different paths by which a beam of light passes through the optical elements;

FIG. 6b is a plan view taken along the line 6b—6b in FIG. 6a that also illustrates various different paths by which a beam of light passes through the optical elements;

FIG. 7a is an elevational view depicting an alternative arrangement for optical elements included in the fingerprint scanner illustrated in FIGS. 1, 4a and 4b, and various different paths by which a beam of light passes through the optical elements;

FIG. 7b is a plan view taken along the line 7b—7b in FIG. 7a that also illustrates various different paths by which a beam of light passes through the optical elements;

FIG. 8 is an elevational view depicting the arrangement of optical elements included in the fingerprint scanner illustrated in FIGS. 6a and 6b including an alternative total internal reflection block that includes an integral lens for improving beam focus throughout the scanned surface, and various different paths by which a beam of light passes through the alternative block;

FIG. 9 is an elevational view depicting an alternative embodiment of the block depicted in FIG. 8 that includes a lens for focusing the beam of light exiting the block;

FIG. 10 is an elevational view depicting an alternative embodiment of the block depicted in FIGS. 2a and 2b in which a scanning beam enters and exits the block through the same face;

FIG. 11 is an elevational view depicting an alternative embodiment of the block depicted in FIG. 10 in which a scanning beam enters and exits the block through the same face;

FIG. 12 is a block diagram depicting portions of the fingerprint scanner together with a scanner driving circuit and a data collection circuit included in the controller for the fingerprint scanner depicted in FIG. 1;

FIG. 13 is a plan view depicting angular deflection of a light beam required for scanning a rectangularly-shaped area on the scanned surface of the block included in the scanner;

FIG. 14 is a plan view depicting a preferred sampling of data by the controller depicted in FIG. 12 to obtain samples of fingerprint data that are uniformly spaced along a X-axis of the scanned surface;

FIG. 15a is an elevational view depicting a preferred driving of the 2D scanner by the controller depicted in FIG. 12 to obtain samples of fingerprint data that are uniformly spaced along a Y-axis of the scanned surface;

FIG. 15b is a plan view depicting samples of fingerprint data that are uniformly spaced along the Y-axis of the scanned surface resulting from the preferred driving of the 2D scanner illustrated in FIG. 15a, and that are also uniformly spaced along the X-axis of the scanned surface by the preferred sampling illustrated in FIG. 14;

FIG. 16a is an elevational view of a protective patch that is applied to the scanned surface of the block depicted in FIGS. 1, 2a, 2b, 4a, 4b, 6a, 6b, 7a, 7b, 8, 9, 10, 11, 13, 14, 15a and 15b;

FIG. 16b is a plan view of the protective patch depicted in FIG. 16a;

FIG. 17 is an elevational view depicting the protective patch depicted in FIGS. 16a and 16b adhered to and forming the scanned surface of the block depicted in FIGS. 1, 2a, 2b, 4a, 4b, 6a, 6b, 7a, 7b, 8, 9, 10, 11, 13, 14, 15a and 15b;

FIG. 18a is a image of a fingerprint signal generated using a fingerprint scanner lacking the protective patch depicted in FIGS. 16a and 16b;

FIG. 18b is a image of a fingerprint signal generated using a fingerprint scanner having installed thereon the protective patch depicted in FIGS. 16a and 16b; and FIG. 19 is a plan view of an authentication token having a 2D barcode embossed thereon.

DETAILED DESCRIPTION OF THE PREFERRED EMBODIMENT

FIG. 1 illustrates a fingerprint scanner in accordance with the present invention, referred to by the general reference character 20. The fingerprint scanner 20 is coupled by a cable 22 to a controller 24 that executes a computer program for controlling operation of the fingerprint scanner 20. The fingerprint scanner 20 includes a protective, box-shaped outer housing 26 which encloses all of the other parts of the fingerprint scanner 20. As depicted in FIG. 1, a portion of the outer housing 26 is open to permit touching, as illustrated in FIG. 2a, a scanned surface 28 with a finger 32 of a human subject (not depicted in any of the FIGS.).

As depicted in FIG. 2a, the scanned surface 28 forms one face of a total internal reflection block 34 that is transparent to electro-magnetic radiation of a pre-established wavelengths. The block 34 includes a radiation inlet-face 36 for admitting into the block 34 a beam 38 of electro-magnetic radiation, depicted by lines in FIGS. 2a and 2b, having the pre-established wavelengths. The block also includes a radiation outlet-face 42 through which exits from the block 34 at least a portion of electro-magnetic radiation admitted into the block 34 through the radiation inlet-face 36. The radiation inlet-face 36 and the radiation outlet-face 42 of the block 34 are distinct from the scanned surface 28. To limit possible loss of electro-magnetic radiation from the block 34 through surfaces other than the scanned surface 28 and the radiation outlet-face 42, other surfaces of the block 34 such as sides 44 and bottom 46 may be coated with a reflective material.

The block 34 is shaped so the beam 38 of electro-magnetic radiation entering the block 34 through the radiation inlet-face 36 impinges upon the scanned surface 28 of the block 34 before exiting from the block 34 through the radiation outlet-face 42. The angles of incidence of the beam 38 on the scanned surface 28 and the refractive index of block 34 are chosen such that if nothing contacts the scanned surface 28 at a location at which the beam 38 impinges upon the scanned surface 28, then the electro-magnetic radiation is totally internally reflected within the block 34 and leaves the block 34 through the radiation outlet-face 42. However, if something having a proper index of refraction contacts the scanned surface 28 at a location where the beam 38 impinges upon the scanned surface 28, then the electro-magnetic radiation leaves the block through the scanned surface 28 rather than through the radiation outlet-face 42. The presently preferred material for the block 34 is either glass or a polymeric material such as polycarbonate or acrylic materials.

The index of refraction of the material forming the block 34 and the wavelengths of electro-magnetic radiation of the beam 38 are chosen such that skin contacting the scanned surface 28 causes the beam 38 to enter the skin of the finger 32 rather than being totally internally reflected within the block 34. Thus, the beam 38 impinging upon the scanned surface 28 at a ridge of the fingerprint in contact with the scanned surface 28 is absorbed into the finger 32 thereby frustrating total internal reflection of electro-magnetic radiation within the block 34. Frustrating total internal reflection of electro-magnetic radiation decreases the amount of radiation that leaves the block 34 through the radiation outlet-face 42. Conversely, valleys in the fingerprint between each immediately adjacent pair of fingerprint ridges do not contact the scanned surface 28, and, therefore, do not absorb the beam 38 thereby permitting total internal reflection of the beam 38 within the block 34.

The fingerprint scanner 20 includes a radiation source 52 that emits the beam 38 of electro-magnetic radiation. The radiation source that is presently preferred to minimize the cost of the fingerprint scanner 20 is a laser diode that emits electro-magnetic radiation at wavelengths between 630 and 780 nanometers, and at a power between 1 and 5 milliwatts. Devices other than a laser diode that lack the precise characteristics described above may be used for the radiation source 52 so long as such alternative device can be focused to a correspondingly small spot size, e.g. 100 microns, over the entire scanned surface 28, and so long as the index of refraction of the material of the block 34 and the wavelengths of the electro-magnetic radiation emitted from the device frustrate total internal reflection of the electro-magnetic radiation at the ridges of a fingerprint contacting the scanned surface 28. Similarly, the wavelength of electro-magnetic radiation emitted from the radiation source 52 need not be monochromatic. Rather, a radiation source used in the fingerprint scanner 20 instead of the presently preferred laser diode may emit radiation across a spectrum of wavelengths such as the entire visible spectrum of light.

In the illustration of FIG. 2a, the beam 38 of electro-magnetic radiation emitted by the radiation source 52 enters a scanning means. The presently preferred scanning means includes a silicon micromachined scanner 54 having a single mirror plate 56 that moves in two orthogonal directions. The micromachined scanner 54 deflects the beam 38 along two, mutually orthogonal axes to form a 2D raster. One embodiment of the micromachined scanner 54 is illustrated in FIGS. 3a through 3d. Technical details pertinent to the micromachined scanner 54 are elaborated in U.S. Pat. No. 5,488,863 entitled "Monolithic Silicon Rate-Gyro With Integrated Sensors" that issued Feb. 6, 1996 ("the Rate Gyro patent"), and in U.S. Pat. No. 5,629,790 entitled "Micromachined Torsional Scanner" that issued May 13, 1997, ("the Torsional Scanner patent"). Both the Rate Gyro patent and the Torsional Scanner patent are hereby incorporated by reference.

As best illustrated in FIG. 3a, the mirror plate 56 is supported within an intermediate oscillating frame 58 of the micromachined scanner 54 by a pair of opposing, collinear inner torsion bars 62 that extend inwardly from the oscillating frame 58 to the mirror plate 56. The inner torsion bars 62 have a longitudinal axis 64 that is collinear with the line 3d—3d. In one embodiment of the micromachined scanner 54, the mirror plate 56 is 3 millimeters ("mm") wide by 3 mm high with a thickness of 300 microns while the inner torsion bars 62 are 45 microns thick, 70 microns wide, and 2 mm long. The mechanical resonant frequency of this mirror plate 56 for oscillatory rotation about the longitudinal axis 64 is approximately 900 Hz, and the oscillating mirror plate 56 exhibits a Q of approximately 1000 when oscillating at normal atmospheric pressure. As depicted in FIGS. 3b–3d, the mirror plate 56 is merely a solid flat plate. However, if desired a lighter but sufficiently stiff mirror plate 56 can be fabricated, as described in greater detail in the Torsional Scanner and Rate Gyro patents, by thinning the center of the mirror plate 56 while leaving a hollow box frame that encircles the perimeter of the mirror plate 56.

The oscillating frame 58 is 8 mm high by 6 mm wide, has a width of 1 mm and a thickness of 300 microns. The oscillating frame 58 is supported within a fixed outer frame 68 by a pair of opposing, collinear outer torsion bars 72 that extend inwardly from the outer frame 68 to the oscillating frame 58. The outer torsion bars 72 have a longitudinal axis 74 that is collinear with the line 3b—3b in FIG. 3a, and that is orthogonal to the longitudinal axis 64 of the inner torsion bars 62. For the embodiment of the micromachined scanner 54 described in the preceding paragraph, the outer torsion bars 72 are 1 mm long, 45 microns thick, and approximately 90 microns wide. As depicted in FIGS. 3b–3d, the oscillating frame 58 is merely a solid flat frame. However, if desired a lighter but sufficiently stiff oscillating frame 58 can be fabricated, as described in greater detail in the Torsional Scanner and Rate Gyro patents, by thinning the outer portion of the oscillating frame 58 while leaving a hollow box frame that encircles the inner perimeter of the oscillating frame 58. The mechanical resonant frequency of the oscillating frame 58 for oscillatory rotation about the longitudinal axis 74 (including the inertia of the mirror plate 56) is approximately 240 Hz, and preferably has a low Q.

The mechanical design described above for supporting the mirror plate 56 and the oscillating frame 58 within the micromachined scanner 54 follows that described in the Torsional Scanner patent. As described in greater detail in the Torsional Scanner patent, care must be exercised in designing the mirror plate 56 and the oscillating frame 58 to ensure an appropriate separation of their respective vibration modes. First, all vibration modes that are higher than rotation about the torsion bars 62 and 72 must have a frequency at least 20% higher than the mechanical resonant frequency for rotation. Also, the vertical rocking vibration mode of the oscillating frame 58 must differ from the mechanical resonant frequency for rotation of the mirror plate 56 by at least 20%. Finally, all other vibration modes of the oscillating frame 58 must differ from the mechanical resonant frequency for rotation of the mirror plate 56 by at least 10%.

The micromachined scanner 54 includes an insulating substrate 82 made from alumina, ceramic, glass etc. that supports the outer frame 68. An insulating spacer 84, screen printed or otherwise formed on the insulating substrate 82, separates the outer frame 68 from the insulating substrate 82. The separation established by the insulating spacer 84 permits concurrent angular rotation of mirror plate 56 about both the inner torsion bars 62 and the outer torsion bars 72.

As best illustrated in FIG. 3d, permanent magnets 86 are disposed along diametrically opposed edges of the sandwitched outer frame 68, insulating substrate 82 and insulating spacer 84. The permanent magnets 86 establish a magnetic B field across the oscillating frame 58, illustrated in FIG. 3d by arrows 88, of a few thousand Gauss. The permanent magnets 86 may be metallic, ceramic or plastic magnets, of the Neodymium Boron or other types.

As illustrated in FIG. 3a, a coil 92 plated onto the oscillating frame 58 encircles its periphery. A pair of electrical contacts 94, located on the outer frame 68, connect to the coil 92 via leads 96 which are brought in over one of the outer torsion bars 72. An electrical current of tens of milliamperes ("mA") coupled into the coil 92 through the electrical contacts 94 combined with the magnetic field established by the permanent magnets 86 produces sufficient force for an angular rotation of several degrees required for the oscillating frame 58 around the longitudinal axis 74 of the outer torsion bars 72.

A pair of rectangularly-shaped apertures 98 pierce the insulating substrate 82 beneath that portion of the oscillating frame 58 furthest from the outer torsion bars 72. Small shock-absorbing pads 102 are screen-printed onto a surface of the insulating substrate 82 immediately adjacent to each of the apertures 98 beneath the oscillating frame 58 and near the outer torsion bars 72 to absorb impact shock should the oscillating frame 58 strike the insulating substrate 82. The apertures 98 permit the oscillating frame 58 to rotate through a larger angle than would be allowed merely by the separation between the outer frame 68 and the insulating substrate 82 established by the insulating spacer 84. Since the oscillating frame 58 is substantially larger than the mirror plate 56, for identical angular rotations the arcuate displacement of the oscillating frame 58 furthest from the outer torsion bars 72 is proportionally larger than a corresponding displacement of the mirror plate 56. Accordingly, the apertures 98 permit an advantageously close spacing of the mirror plate 56 to the insulating substrate 82 while allowing adequate rotation for the oscillating frame 58.

As best depicted in FIGS. 3a and 3b, the insulating substrate 82 also carries screen-printed, electrically conductive electro-static drive plates 106 immediately adjacent to the mirror plate 56. When the mirror plate 56 is stationary, the separation between the electrostatic drive plates 106 and the immediately adjacent surface of the mirror plate 56 is approximately 100–150 microns. Electrically conductive leads 108, that are disposed on the surface of the insulating substrate 82, pass beneath the insulating spacer 84 to connect the electrostatic drive plates 106 to electrical contacts 112 that are also disposed on the insulating substrate 82. The electrical contacts 112 permit applying an oscillatory electro-static driving voltage between the mirror plate 56 and the electrical contacts 112. The preceding arrangement of the micromachined scanner 54 and the insulating substrate 82 and the Q of the insulating substrate 82 permits a one-hundred (100) volt ("V") alternating current ("AC") driving potential at the mechanical resonant frequency of the mirror plate 56 to apply a force to the mirror plate 56 which deflects the mirror plate 56 approximately plus-and-minus six (∓6) degrees.

Referring again to FIGS. 2a and 2b, in addition to the micromachined scanner 54 the scanning means also includes a beam-focusing lens 122 through which the beam 38 passes after reflecting from the mirror plate 56 of the micromachined scanner 54. The beam-focusing lens 122, which merely focuses the beam 38 at the scanned surface 28, could alternatively be located along the path of the beam 38 between the radiation source 52 and the micromachined scanner 54. After passing through the beam-focusing lens 122, the beam 38 reflects off a rectangularly-shaped mirror 124 also included in the scanning means to enter into the block 34 through the radiation inlet-face 36. In this way the beam 38, as deflected by the micromachined scanner 54, impinges upon the scanned surface 28 as a 2D raster 132, illustrated in FIG. 1, with respect to an X-axis 134 and a Y-axis 136. Thus the micromachined scanner 54 of the scanning means deflects the beam 38 in 2 orthogonal directions throughout a 15×20 mm area of the scanned surface 28 provided for contact between the finger 32 and the block 34.

As described previously, valleys in the fingerprint between each immediately adjacent pair of fingerprint ridges do not contact the scanned surface 28, and, therefore, do not absorb the beam 38 impinging upon the immediately adjacent scanned surface 28. At such locations, the beam 38 impinging upon the scanned surface 28 is totally reflected internally within the block 34, and therefore exits the block 34 through the radiation outlet-face 42. Accordingly, the fingerprint scanner 20 includes a rectangularly-shaped radiation detector 142 that, in the embodiment of the fingerprint scanner 20 depicted in FIGS. 2a and 2b, is mounted directly onto the radiation outlet-face 42. The radiation detector 142 is sufficiently large that it receives the beam 38 exiting the block 34 through the radiation outlet-face 42 regardless of where the beam 38 impinges upon the scanned surface 28. The radiation detector 142 responds to the electro-magnetic radiation of the beam 38 received in this way by producing a time-varying electrical signal that represents the fingerprint of the finger 32 then touching the scanned surface 28 of the block 34. The radiation detector 142 may be provided by a photo-cell, a photo-diode, or an avalanche photo-diode, or other similar component. However, it is advantageous to keep the size of the radiation detector 142 as small as practical to permit generation of high-frequency signals representing the fingerprint of the finger 32 then touching the scanned surface 28 of the block 34.

To obtain a coherent 2D raster 132 and representation of the fingerprint, the scanning movements of the beam 38 across the scanned surface 28 parallel respectively to the X-axis 134 and Y-axis 136 must be synchronized. For the resolution requirements of fingerprint scanning, a scan parallel to the Y-axis 136 that permits 512 or 640 scan lines parallel to the X-axis 134 is adequate. Accordingly, the scan parallel to the X-axis 134 can be very fast in comparison with a much slower scan parallel to the Y-axis 136.

In this way the requirements for scanning along the X-axis 134 and Y-axis 136 are most easily satisfied if the micromachined scanner 54 employs a fast, resonant frequency electrostatic drive of the mirror plate 56 for deflecting the beam 38 parallel to the X-axis 134, while deflection of the beam 38 parallel to the Y-axis 136 is achieved by driving the oscillating frame 58 below its mechanical resonant frequency with the disclosed galvanometric drive. The operating frequency for the galvanometrically driven oscillating frame 58 may conveniently be set to a fixed integer ratio, e.g. $1/2^n$, times lower than the operating frequency for the mirror plate 56, where n may range from 8 to 10. Employing such a fixed integer ratio between the operating frequencies of the oscillating frame 58 and the mirror plate 56 provides 256 to 1024 scan lines parallel to the X-axis 134 for each scan parallel to the Y-axis 136. The current supplied to coil 92 should be programmed to provide equidistant spaced scan lines for the beam 38 parallel to the X-axis 134. As described in greater detail below, any fixed integer frequency ratio is easily obtained by dividing down the frequency of the signal which electrostatically drives movement of the mirror plate 56 for deflecting the beam 38 parallel to the X-axis 134. Operating in this way, perfect synchronization occurs between movements of the beam 38 parallel to the X-axis 134 and Y-axis 136 respectively.

Because the mirror plate 56 is driven electrostatically at its mechanical resonant frequency, the beam 38 moves across the scanned surface 28 with a sinusoidal velocity in traveling parallel to the X-axis 134. Driving the oscillating frame 58 galvanometrically at a frequency that is far below the mechanical resonant frequency of the oscillating frame 58 permits moving the beam 38 across the scanned surface 28 parallel to the Y-axis 136 with a linear velocity.

To continuously sense the position along the Y-axis 136 at which the beam 38 is impinging upon the scanned surface 28, one of the outer torsion bars 72 that supports the oscillating frame 58 within the outer frame 68 includes a torsion sensor 146 depicted in FIG. 3a. The Rate Gyro and Torsional Scanner patents identified above describe fully the construction and operation of the torsion sensor 146. As described in the Rate Gyro and the Torsional Scanner patents, an electric current applied to the torsion sensor 146 through sensor-current terminals 152 and 154 flows across the outer torsion bar 72. An output voltage from the torsion sensor 146 that is proportional to stress in the outer torsion bar 72 appears across sensor-output terminals 162 and 164. If so desired the output signal from the torsion sensor 146 may be used to measure rotation of the oscillating frame 58 about the longitudinal axis 74 and/or concurrently control a galvanometric drive of the oscillating frame 58.

Referring again to FIGS. 2a and 2b, elongated, rectangularly shaped photo-diodes 192 may be mounted along opposite edges of the scanned surface 28 outside of an area of the scanned surface 28 contacted by the finger 32. The photo-diodes 192 are oriented so their photosensitive face contacts the block 34, and their longitudinal axes lie parallel to the Y-axis 136. Electrical signals produced by the photo-diodes 192, provide reference signals for scanning the beam 38 parallel to the X-axis 134, and can provide a linear calibration of the 2D raster 132 if needed. Instead of the photo-diodes 192 a material having an index of refraction suitable for frustrating total internal reflection of the beam 38 impinging on the scanned surface 28 may also be applied to the scanned surface 28 to delineate the scanner's aperture. If total internal reflection is frustrated, then a reference timing signal for the beam 38 parallel to the X-axis 134 and Y-axis 136 can be derived from the signal produced by the radiation detector 142. The signals produced by the radiation detector 142, the torsion sensor 146, and the photo-diodes 192, if they are included in the fingerprint scanner 20, allow for the full reconstruction of the image of the fingerprint.

It can be readily appreciated that the overall structure of the fingerprint scanner 20 is very compact, and provides for multiple functions in a very small and inexpensive package. For example, the outer housing 26 of the fingerprint scanner 20 illustrated in FIG. 1 measures 0.5 inches by 1.0 inches by 2.5 inches. Accordingly, the outer housing 26 occupies a volume of less than twenty-one (21) cubic-centimeters ("$cm^3$"), while the scanned surface 28 of the block 34 contacted by the finger 32 has a surface area which is no larger than three (3) square-centimeters ("$cm^2$")

FIGS. 4a and 4b depict an alternative embodiment of the fingerprint scanner 20 illustrated in FIGS. 2a and 2b. Those elements depicted in FIGS. 4a and 4b that are common to the fingerprint scanner 20 depicted in FIGS. 2a and 2b carry the same reference numeral distinguished by a prime ("'") designation. The embodiment depicted in FIGS. 4a and 4b differs from that depicted in FIGS. 2a and 2b in that the micromachined scanner 54 depicted in FIGS. 2a and 2b is replaced by a silicon 1D micromachined scanner 202 having a mirror plate 204 that rotates about only a single vertical rotation-axis 206 depicted in FIG. 4a. The embodiment depicted in FIGS. 4a and 4b further differs from that depicted in FIGS. 2a and 2b in that the fixed mirror 124 depicted in FIGS. 2a and 2b is replaced by a second silicon 1D micromachined scanner 212 having a mirror plate 214 that rotates about only a single horizontal rotation-axis 216 depicted in FIG. 4b. The structure of the 1D micromachined scanner 202 may be similar to that of the micromachined scanner 54 omitting the oscillating frame 58 and the inner torsion bars 62, and connecting the outer torsion bars 72 directly between the outer frame 68 and the mirror plate 56. The structure of the 1D micromachined scanner 212 may also be similar to that of the micromachined scanner 54 except the mirror plate 56 and the inner torsion bars 62 are omitted and the oscillating frame 58 is filled with a solid plate.

In the embodiment of the fingerprint scanner 20 depicted in FIGS. 4a and 4b, the mirror plate 204 sweeps the beam 38' emitted by the radiation source 52' along a path on the mirror plate 214 that is centered on the horizontal rotation-axis 216. The 1D micromachined scanner 212 in turn sweeps the impingement point of the beam 38 along the scanned surface 28' parallel to the Y-axis 136'. The compound deflections of the beam 38 produced by the combined 1D micromachined scanners 202 and 212 can generate the same 2D raster 132' on the scanned surface 28' as can be generated by the micromachined scanner 54. To generate the same 2D raster 132' as that generated by the micromachined scanner 54, the 1D micromachined scanner 202 sweeps the beam 38' back-and-forth along the mirror plate 214 at a high frequency while the mirror plate 214 sweeps the beam 38' back-and-forth along the scanned surface 28' more slowly.

The embodiment of the fingerprint scanner 20 depicted in FIGS. 4a and 4b decouples the scanning motions very simply, and thereby avoids electrostatic pickup in the torsion sensor 146' included in the 1D micromachined scanner 212. Analogously to the micromachined scanner 54, high frequency sinusoidal deflection of the mirror plate 204 can be induced by an electrostatically applied force, while slow speed, deflection at a suitable sub-harmonic of the mirror plate 204 can be induced by a force applied electromagnetically to the mirror plate 214. However, as contrasted with the fingerprint scanner 20 depicted in FIGS. 2a and 2b, if desired rotations both of the mirror plate 204 and the mirror plate 214 could be induced in the fingerprint scanner 20 depicted in FIGS. 4a and 4b by forces applied solely electro-magnetically.

FIG. 5 is a plan view illustrating the presently preferred embodiment of the silicon micromachined scanner 54 omitting the insulating substrate 82 and insulating spacer 84. Those elements depicted in FIG. 5 that are common to the micromachined scanner 54 depicted in FIGS. 3a, 3b, 3c and 3d carry the same reference numeral distinguished by a prime ("'") designation. The micromachined scanner 54' depicted in FIG. 5 differs from the micromachined scanner 54 depicted in FIGS. 3a and 3b in the following ways.

First, as depicted in FIG. 5 the oscillating frame 58' is "butterfly shaped" which increases the area, mass and moment of inertia of the oscillating frame 58', and which permits longer outer torsion bars 72' without increasing the size of the outer frame 68'. Furthermore, the butterfly-shaped oscillating frame 58' more completely fills the area within the inner perimeter of the outer frame 68 leaving only a narrow gap 222 between the inner perimeter of the outer frame 68' and the outer perimeter of the oscillating frame 58'. The presence of the narrow gap 222 increases pneumatic damping of the rotation of the oscillating frame 58' about the longitudinal axis 74', and correspondingly reduces the Q of the oscillating frame 58'. Narrowing or widening the gap 222 varies the amount of the pneumatic damping as well as the amount of the Q reduction.

The butterfly shaped oscillating frame 58' surrounds and supports through the inner torsion bars 62' a 1500 micron× 1500 micron mirror plate 56' that is 300 microns thick. Supported by inner torsion bars 62' that are 40 microns thick, 50 microns wide and 500 microns long, the mirror plate 56' has a mechanical resonant frequency of 5000 Hz. The outer perimeter of the 300 micron thick oscillating frame 58' measures 4500 microns along the shorter sides and 6000 microns along the longer sides. The outer torsion bars 72' are 40 microns thick, 80 microns wide, and 1,000 microns long. The oscillating frame 58' may be formed with a thicker reinforcing frame around its inner perimeter to rigidly support the inner torsion bars 62' and the mirror plate 56' within the oscillating frame 58'.

Second, the micromachined scanner 54' employs a multi-turn, spiral coil 92'. The micromachined scanner 54' in connecting one end of the coil 92' to one of the electrical contacts 94', employs an electrical insulating layer 224 separating the coil 92' from the lead 96' where one of the leads 96' crosses over the coil 92'. As with the micromachined scanner 54 depicted in FIGS. 3a and 3b, a pair of electrical contacts 94' located on the outer frame 68' permit supplying an electric current up to approximately 150 mA to the coil 92' for rotating the oscillating frame 58' about the longitudinal axis 74'.

Lastly, the presently preferred micromachined scanner 54' includes a pair of torsion sensors 146a' and 146b', one of which is located on one of the inner torsion bars 62', and the other of which is located on one of the outer torsion bars 72'. To respectively supply current to and receive a voltage from the pair of torsion sensors 146a' and 146b', the micromachined scanner 54' includes two sets of sensor-current terminals 152a'–154a' and 152b'–154b', and two sets of sensor-output terminals 162a'–164a' and 162b'–164b'. Similar to the electrical insulating layer 224 described above, the leads connecting the torsion sensor 146a' that is located on one of the inner torsion bars 62' are insulated from the coil 92' by an electrical insulating layer 226 where those leads cross over the coil 92' before crossing over the outer torsion bar 72' in connecting to the terminals 152a', 154a', 162a' and 164a'. In all other pertinent aspects, the torsion sensors 146a' and 146b' are identical to the torsion sensor 146 described above and depicted in FIGS. 3a, 4 and 5.

FIGS. 6a and 6b depict a preferred arrangement for the optical elements included in the fingerprint scanner 20 as illustrated in FIGS. 2a and 2b. Those elements depicted in FIGS. 6a and 6b that are common to the fingerprint scanner 20 depicted in FIGS. 2a and 2b carry the same reference numeral distinguished by a prime ("'") designation. The optical elements depicted in FIGS. 6a and 6b differ from those depicted in FIGS. 2a and 2b in the following ways. First, the preferred arrangement repositions the beam-focusing lens 122' along the beam 38' to interposed it between the radiation source 52' and the micromachined scanner 54' rather than between the micromachined scanner 54' and the radiation inlet-face 36' of the block 34'. Second, the preferred arrangement omits the mirror 124 that in the illustration of FIGS. 2a and 2b is located immediately adjacent to the block 34. Lastly, the radiation detector 142' is moved away from the radiation outlet-face 42' and a light collection lens 322 interposed between the radiation outlet-face 42' and the radiation detector 142'. The light collection lens 322 is designed to image the mirror plate 56' of the micromachined scanner 54' onto the radiation detector 142'.

FIGS. 7a and 7b depict an alternative arrangement for the optical elements included in the fingerprint scanner 20 as illustrated in FIGS. 4a and 4b. Those elements depicted in FIGS. 7a and 7b that are common to the fingerprint scanner 20 depicted in FIGS. 4a and 4b carry the same reference numeral distinguished by a double prime ("''") designation. The optical elements depicted in FIGS. 7a and 7b differ from those depicted in FIGS. 4a and 4b in the following ways. First, similar to FIGS. 6a and 6b the preferred arrangement repositions the beam-focusing lens 122" along the beam 38" to interposed it between the radiation source 52" and the micromachined scanner 54" rather than between the micromachined scanner 54" and the radiation inlet-face 36" of the block 34". Second, the preferred arrangement repositions the 1D micromachined scanner 212" closer to the 1D micromachined scanner 202". Repositioning of the 1D micromachined scanner 212" closer to the 1D micromachined scanner 202" permits using a much smaller 1D micromachined scanner 212" for deflecting the beam 38" parallel to the X-axis 134".

FIG. 8 depicts the arrangement of optical elements included in the fingerprint scanner 20 illustrated in FIGS. 6a and 6b. Those elements depicted in FIG. 8 that are common to the optical elements of the fingerprint scanner 20 depicted in FIGS. 6a and 6b carry the same reference numeral distinguished by a triple prime ("'''") designation. The illustration of FIG. 8 includes an alternative total internal reflection block 34'" having a curved, cylindrically-shaped radiation inlet-face 36'" that provides a second beam-focusing lens 332 of varying focus. The beam-focusing lens 332 is shaped to maintain focus of the beam 38'" on the scanned surface 28'" as the micromachined scanner 54'" deflects the beam 38'" along the Y-axis 136'". The block 34'" depicted in FIG. 8 also includes a curved surface 334 opposite the scanned surface 28'". The surface 334, which either provides total internal reflection of the beam 38 or is coated with a reflective material to form a mirror, redirects the beam 38'" reflected off the scanned surface 28'" thereby gathering it so it exits the block 34'" through the radiation outlet-face 42'".

FIG. 9 depicts an alternative embodiment of the block 34'" depicted in FIG. 8. Differing from the block 34'" depicted in FIG. 8, the block 34'" depicted in FIG. 9 has a curved radiation outlet-face 42'". Similar to the preferred embodiment depicted in FIGS. 6a and 6b, the curved radiation outlet-face 42"" provides the light collection lens 322"" for imaging the micromachined scanner 54'" onto the radiation detector 142'".

FIG. 10 depicts an alternative embodiment of the block 34 depicted in FIGS. 2a and 2b. Those elements depicted in FIG. 10 that are common to the block 34 depicted in FIGS. 2a and 2b carry the same reference numeral distinguished by a quadruple prime ("''''") designation. The block 34"" differs from the block 34 depicted in FIGS. 2a and 2b in that a common face of the block 34"" provides both the radiation inlet-face 36"" and the radiation outlet-face 42". To permit a common f ace of the block 34"" to provide both the radiation inlet-face 36"" and the radiation outlet-face 42''', the block 34"" of FIG. 10 includes a planar mirror face 342 that is coated with a reflective material. Consequently, the beam 38"" after reflecting off the scanned surface 28"" then reflects off the mirror face 342 before exiting the block 34"" to impinge upon the radiation detector 142"". The block 34"" depicted in FIG. 11 differs from the block 34"" depicted in FIG. 10 in that the mirror face 342"" is curved rather than planar. Similar to the light collection lens 322 or 322"" depicted respectively in FIGS. 6a–6b and 9, the mirror face 342"" is shaped to image the micromachined scanner 54"" onto the radiation detector 142"".

Driving and Data Collection Circuit

The block diagram of FIG. 12 depicts a self-oscillating driving circuit for deflecting the beam 38 along the X-axis 134 of the 2D raster 132'. Items depicted in FIG. 12 that are to the left of a dashed line 228 are located in the fingerprint scanner 20 while items located to the right of the dashed line 228 are located in the controller 24. In this self-oscillating circuit, the torsion sensor 146a', located on the inner torsion bar 62' of the micromachined scanner 54', supplies its output signal to a phase-shifting circuit 232. The output signal from the phase-shifting circuit 232 is supplied to a X-axis amplifier 234 which alternatively supplies electrical signals to one or the other of the electrostatic drive plates 106' for attracting either one side or the other side of the mirror plate 56' toward the insulating substrate 82. Because the mirror plate 56' has a high Q, the circuit including the mirror plate 56' oscillates at the mechanical resonant frequency of the mirror plate 56', and therefore sweeps the beam 38 back and forth parallel to the X-axis 134 with a sinusoidal velocity at the mechanical resonant frequency of the mirror plate 56'.

An output signal from the X-axis amplifier 234 at the mechanical resonant frequency of the mirror plate 56', after being multiplied in frequency by a fixed integer ratio, e.g. $1/2^n$, by a multiplier 236, is supplied as a data sampling clock signal to an external-clock input 238 of a fingerprint-data collection-unit 242 included in the controller 24. The same output signal from the X-axis amplifier 234 is also supplied to a clock input 254 of an up-down counter 256, where as stated previously n may range from 8 to 10.

The driving circuit includes a start button 262 which upon being pressed supplies a signal to a trigger input 264 of the controller 24, and to an initialization input 266 of the up-down counter 256. Upon receiving a signal from the start button 262, the up-down counter 256 is initialized to a count which specifies that the maximum amount of current is to be supplied to the coil 92' on the oscillating frame 58'. After being initialized, depending upon the value to which the up-down counter 256 was initialized, the up-down counter 256 begins either incrementing or decrementing in response to the signal received from the X-axis amplifier 234. All bits of the count present in the up-down counter 256 are supplied as input signals to an digital-to-analog ("DAC") converter 268.

An adjustable precision voltage reference 272 supplies a reference voltage to the DAC 268 for controlling the maximum analog voltage that the DAC 268 may supply as an input signal to a current amplifier 274. Responsive to the magnitude and sign of the voltage received from the DAC 268, the current amplifier 274 supplies a current to the coil 92' which immediately after the start button 262 is pressed initially becomes the maximum either positive or negative current depending upon the initialization value of the up-down counter 256. Then, every 1024 deflections of the beam 38 parallel to the X-axis 134, the up-down counter 256 either decrements or increments thereby progressively first reducing the current through the coil 92', and then subsequently increasing the current through the coil 92' until reaching the maximum opposite current, either negative or positive. Operating in this way, the driving circuit causes rotation of the oscillating frame 58' about the longitudinal axis 74' induced by current flowing though the coil 92' to adaptively deflect the beam 38 parallel to the Y-axis 136 with a linear velocity.

The block diagram of FIG. 12 also depicts a detection circuit that receives the output signal from the radiation detector 142 at an inverting input 282 of an input amplifier 284. The output signal from the input amplifier 284 is also supplied as an input signal to a buffer amplifier 288, which in turn supplies the signal from the radiation detector 142 as fingerprint data to a data input 292 of the controller 24. In this way, each pressing of the start button 262 causes data for an image of a fingerprint to be relayed to the fingerprint-data collection-unit 242.

The plan view of FIG. 13 depicts angular deflections of the beam 38 required for scanning a rectangularly-shaped area on the scanned surface 28 of the block 34. As depicted in FIG. 13, the beam 38 must be deflected through a larger angle to reach corners of the rectangularly-shaped scanned surface 28 closest to the micromachined scanner 54' than to reach corners furthest from the micromachined scanner 54'. Since the mirror plate 56' oscillates sinusoidally at its mechanical resonant frequency in scanning parallel to the X-axis 134, due to the high Q of the mirror plate 56 the actual angular deflection of the beam 38 parallel to the X-axis 134 remains essentially constant regardless of the position of the beam 38 along the Y-axis 136. Thus, angular rotation of the mirror plate 56' sufficient to deflect the beam 38 into corners of the scanned surface 28 nearest to the micromachined scanner 54' cause the beam 38 in scanning parallel to the X-axis 134 to be progressively deflected ever longer distances beyond the sides of the scanned surface 28 as the beam 38 moves progressively further away from the micromachined scanner 54 along the Y-axis 136.

To obtain a uniform spacing of fingerprint image points along the X-axis 134 as indicated by short dashed lines 352 in FIG. 14, the controller 24 preferably varies the time between acquisition of successive fingerprint data values depending upon the location of the beam 38 along the X-axis 134. That is, as the beam 38 scans parallel to the X-axis 134, the fingerprint-data collection-unit 242 of the controller 24 acquires successive fingerprint data values at some pre-established time interval between successive values. Moreover, due to the sinusoidal velocity of the beam 38 parallel to the X-axis 134, successive fingerprint data sampling time intervals vary along the same scan line depending upon the position of the beam 38 along the X-axis 134.

As illustrated in FIG. 15a, the location of the beam 38 along the beam 38 does not change uniformly for a pre-established rotation of the mirror plate 56". Consequently, the controller 24 must precisely control the electrical current supplied to the coil 92 depending upon the location of the beam 38 along the Y-axis 136 to obtain uniform spacing of fingerprint data values along the Y-axis 136 as indicated by a grid of square blocks 356 in FIG. 15b. Furthermore, as the beam 38 moves along the scanned surface 28 parallel to the Y-axis 136 the fingerprint data sampling time intervals between corresponding locations along the X-axis 134 also change. That is, as the beam 38 moves along the Y-axis 136 progressively further from the micromachined scanner 54, the fingerprint-data collection-unit 242 acquires successive fingerprint data values with shorter time intervals than the time intervals for corresponding locations along the X-axis 134 nearer to the micromachined scanner 54. Thus, by varying the sampling rate of the fingerprint-data collection-unit 242 depending upon the location of the beam 38 both along the X-axis 134 and along the Y-axis 136 and by varying the electrical current supplied to the coil 92, as indicated in FIG. 15b the fingerprint-data collection-unit 242 can acquire fingerprint data values that are uniformly spaced both along the Y-axis 136 and the X-axis 134 regardless of the position of the beam 38 along those axes.

Resilient Protective Scanned Surface 28

As explained above, total internal reflection of the beam 38 within the block 34 occurs at locations on the scanned surface 28 at which valleys in the fingerprint between immediately adjacent pairs of fingerprint ridges do not contact the scanned surface 28. Using total internal reflection in acquiring an electrical signal representing a fingerprint assumes that no scattering occurs from the scanned surface 28 due to scratches therein. The presence of any scratches in the scanned surface 28 prevents contact between the scanned surface 28 and fingerprint ridges at the location of each scratch. Therefore, fingerprint data acquired from scratched areas of the scanned surface 28 will indicate the presence of valleys in the fingerprint rather than ridges. If too many defective areas exist on the scanned surface 28 then the integrity of the acquired fingerprint data may be substantially compromised, and may no longer be acceptable. If such a condition occurs, then the scanned surface 28 must be replaced. For a very widely disseminated, small, compact fingerprint scanner 20 integrated into a small portable device or into a keyboard, replacement of the scanned surface 28 is a very undesirable procedure.

To provide an easily replaceable scanned surface 28 for the fingerprint scanner 20 that restores its optical quality, the scanned surface 28 includes a removable patch 302 depicted in FIGS. 16a and 16b. The presently preferred material for the patch 302 includes a relatively hard plastic polymeric material backing layer 304 that is approximately 100 to 200 microns thick. Joined to the backing layer 304 to be supported thereby is a transfer layer 306 that is approximately 150 to 200 microns thick. The transfer layer 306 is covered by a thin, pliable, removable protective-layer 308. Formed along an edge of the patch 302 are tabs 304a and 308a that facilitate removal of the layers 304 and 308 from the transfer layer 306 when desired during installation of the patch 302 onto the block 34.

To be effective for ensuring the optical quality of the scanned surface 28, the transfer layer 306 must be transparent to electro-magnetic radiation of the beam 38. Furthermore, the transfer layer 306 must come into perfect optical contact with the block 34 uniformly over the entire area of the scanned surface 28, and have an index of refraction closely matched to that of the block 34. Any inclusion of small pockets of air between the block 34 and the transfer layer 306 are equivalent to scratches on the scanned surface 28, and will therefore compromise the integrity of the acquired fingerprint data. Thus, the transfer layer 306 must contact the block 34 uniformly, and the contact must be of optical quality without application of an optical contact grease or coupling agent since such procedures are unacceptable for a consumer type operating environment such as that in which the fingerprint scanner 20 is to be used. The patch 302 must be easily applied to the block 34, and must be easily replaceable by an unskilled user employing a simple and uncomplicated procedure. It also appears advantageous if the transfer layer 306 is somewhat rubbery and conformable to facilitate intimate contact between ridges on the finger 32 and the transfer layer 306.

A material that is well suited for use as the patch 302 is a gel layer material sold commercially under the trademark Gel-Pak® by the Gel-Pak division of Vichem Corporation that is located at 756 North Pastoria Avenue, Sunnyvale, Calif. 94086. The intended use for the Gel-Pak material is firmly securing silicon samples and integrated circuit chip dies to a solid surface. The gel material layer in Gel-Pak bonds well both to glass and to plastic polymeric material surfaces (suitably treated if necessary), and can be readily removed if required. The particular Gel-Pak material product designations that have been found most suitable for the patch 302 are a PF Film X8 and a PF Film Xθ.

A procedure for applying a Gel-Pak patch 302 is as follows. The removable protective-layer 308 is removed from the patch 302 thereby exposing one surface of the transfer layer 306. The transfer layer 306 of the Gel-Pak material is very resilient, and is attached to the stiffer backing layer 304. The transfer layer 306 as supported by the backing layer 304 is then pressed onto the block 34 and forms a high-grade optical contact between the Gel-Pak transfer layer 306 and the block 34. The transfer layer 306 is preferably pressed onto the block 34 using a rolling process progressing from one end of the block 34 to the other end of the block 34. After the transfer layer 306 has been pressed into contact with the block 34, the backing layer 304 is then removed from the transfer layer 306 thereby exposing one surface of the transfer layer 306 as the scanned surface 28 of the fingerprint scanner 20, as illustrated in FIG. 17. To ensure that the backing layer 304 may be removed from the transfer layer 306 without disturbing adhesion of the transfer layer 306 to the block 34, the adhesive characteristics of the backing layer 304 are chosen so its adhesive force to the transfer layer 306 is less than the adhesive force of the transfer layer 306 to the block 34. If it becomes necessary to replace the protective transfer layer 306 of the patch 302 forming the scanned surface 28 of the fingerprint scanner 20, the Gel-Pak transfer layer 306 can be readily pealed off the block 34 without any difficulty and the transfer layer 306 of a new patch 302 installed. The final configuration with the transfer layer 306 adhered to the block 34 is that illustrated in FIG. 17 with the transfer layer 306 positioned on top of the block 34 thereby forming the scanned surface 28 touched by the finger 32.

It has been observed that the use of the Gel-Pak transfer layer 306 enhances the quality of the fingerprint signal generated by the fingerprint scanner 20. FIG. 18a shows a fingerprint signal generated by the fingerprint scanner 20.having a bare glass scanned surface 28. FIG. 18b shows a fingerprint signal generated by the fingerprint scanner 20 with the Gel-Pak transfer layer 306 installed onto the block 34. A visual comparison of FIG. 18a with FIG. 18b establishes that FIG. 18b exhibits better definition of the edges of fingerprint ridges. The improved quality of the fingerprint signal achieved by the fingerprint scanner 20 having the Gel-Pak transfer layer 306 installed thereon appears to result from a hydrophobic characteristic of the surface of the transfer layer 306. The hydrophobic characteristic of the transfer layer 306 reduces spread of skin oils in contact areas between the coated scanned surface 28 and fingerprint ridges. FIGS. 10a and 10b do not indicate any loss of resolution due to installation of the transfer layer 306 onto the block 34. In fact, images of sweat pores in the fingerprint shown in FIG. 18b appear improved.

It appears likely that other film materials such as polyvinyl or silicone rubber films may also be suitable for use as the transfer layer 306. It would also be advantageous if the transfer layer 306 were tinted to be transparent to electro-magnetic radiation at the wavelengths of the beam 38, and to be less transparent to electro-magnetic radiation at wavelengths other than those wavelengths. Such tinting of the transfer layer 306 would reduce any possible degradation of the fingerprint signal caused by ambient light entering the block 34 and impinging upon the radiation detector 142, perhaps because the finger 32 is incorrectly positioned on the scanned surface 28.

The fingerprint scanner 20 constitutes an image building system. That is, the image generated by the fingerprint scanner 20 depends only upon the time-varying electrical signal produced by the radiation detector 142, and upon beam scanning position data supplied by the torsion sensors 146a' and 146b' included in the preferred micromachined scanner 54'. Stated in a different way, the resolution and quality of an image generated by the fingerprint scanner 20 does not depend upon optically projecting or focusing an image of the scanned surface 28 onto the radiation detector 142. Thus, an image prepared from data generated by the fingerprint scanner 20 is always in focus even though the finger 32 moves while the beam 38 scans the scanned surface 28. That is, if the finger 32 moves while the beam 38 scans the scanned surface 28, the image prepared from such data will be distorted, but it will always retain high contrast and never be blurred such as occurs with CCD and other imaging type scanners. Because the image built by the fingerprint scanner 20 though perhaps distorted is always in focus, fingerprint data acquired during successive scans of the scanned surface 28 may be juxtaposed to fill in areas of the fingerprint missed during one or more successive scans perhaps because the finger 32 moves across the scanned surface 28 during some of the scans. Thus, data for a "rolled fingerprint" can be obtained by accumulating fingerprint data from several successive scans.

While FIGS. 3a and 4a depict the radiation outlet-face 42 and 42' as being orthogonal to the scanned surface 28 and 28', the radiation outlet-face 42 and 42' may advantageously be oriented at another angle with respect to the scanned surface 28 and 28' which minimizes the width required for the radiation detector 142 and 142'. Minimizing the width required for the radiation detector 142 and 142' improves the high frequency electrical signal performance thereof.

To obtain the high resolution from the fingerprint scanner 20, it appears advantageous to sample the electrical signal produced by the radiation detector 142 or 142' every time the beam 38 or 38' moves one-quarter of its diameter along the scanned surface 28 or 28'.

While FIG. 12 depicts the driving and data collection circuits as a number of individual blocks, the circuit depicted in that FIG. can, in fact, be implemented in a single integrated circuit that may also be enclosed within the outer housing 26.

While all of the silicon, micromachined scanners 54, 202 and 212 may, in principle, be replaced by classical resonating, rotating or galvanometric scanners, both the cost and the size of a fingerprint scanner so constructed would be so great as to be commercially impractical compared to the compact, simple, and economical fingerprint scanner 20 of the present invention.

While the replaceable patch 302 secured to the block 34 provides the presently preferred scanned surface 28 for the fingerprint scanner 20, it is feasible to provide a non-replaceable resilient scanned surface 28 integrally formed monolithically on the block 34 by properly fabricating the block 34 from suitable plastic polymeric materials.

While fingerprint scanning is the intended use for the fingerprint scanner 20, the fingerprint scanner 20 may also be used for scanning or "reading" other items. For example, if an authentication token 362 such as that illustrated in FIG. 19, e.g. a credit card or badge, includes a 2D barcode embossed thereon, pressing the barcode against the scanned surface 28 permits the fingerprint scanner 20 to read the barcode to obtain authentication information such as a personal identification number ("PIN") or fingerprint data. If the authentication information is fingerprint data, after the fingerprint scanner 20 acquires the authentication information, the bearer of the authentication token can press their finger against the scanned surface 28 which then obtains fingerprint data for comparison with that previously obtained from the authentication token. The fingerprint scanner 20 could similarly read business cards embossed with a 2D barcode that encodes the information printed on the business card.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A compact, simplified, image-building scanner for generating a time-varying electrical signal that represents a fingerprint of a human subject, the scanner comprising:

a solid block formed from a material that is transparent to electro-magnetic radiation of a pre-established wavelength, said block including a scanned surface that the human subject touches with a finger for which a representation of the fingerprint is to be generated, said block also including a radiation inlet-face for admitting into said block a beam of electro-magnetic radiation having the pre-established wavelength, and said block further including a radiation outlet-face through which exits from said block at least a portion of electro-magnetic radiation admitted into said block through the radiation inlet-face, the radiation inlet-face and the radiation outlet-face of said block being distinct from the scanned surface thereof, said block being shaped so that the beam of electro-magnetic radiation entering through the radiation inlet-face impinges upon the scanned surface of said block before exiting from said block through the radiation outlet-face;

a radiation source for emitting a beam of electro-magnetic radiation having the pre-established wavelength;

a first micromachined scanner having a mirror for deflecting the beam emitted from said radiation source, the beam of electro-magnetic radiation emitted by said radiation source impinging upon the mirror of said first micromachined scanner and being deflected thereby to form a two dimensional ("2D") raster of the beam, the 2D raster formed by the deflected beam emitted from said first micromachined scanner being directed into said block through the radiation inlet-face thereof, whereby the 2D raster of the beam impinges upon the scanned surface of said block; and a radiation detector which receives electro-magnetic radiation admitted into said block through the radiation inlet-face thereof, impinges upon the scanned surface of said block, and exits from said block through the radiation outlet-face thereof, said radiation detector being responsive to the received electro-magnetic radiation for producing the time-varying electrical signal that represents the fingerprint of the human subject's finger then touching the scanned surface of said block.

2. The scanner of claim 1 wherein a material for said block is selected from a group consisting of glass and polymeric materials.

3. The scanner of claim 1 wherein the electro-magnetic radiation has a pre-established wavelength between 630 and 780 nanometers.

4. The scanner of claim 1 wherein the radiation outlet-face is distinct from the radiation inlet-face.

5. The scanner of claim 1 wherein the radiation outlet-face is identical to the radiation inlet-face.

6. The scanner of claim 1 wherein said radiation source is a laser diode.

7. The scanner of claim 1 wherein the beam emitted by said radiation source has a power between 1 and 5 milliwatts.

8. The scanner of claim 1 wherein said first micromachined scanner has a single mirror that rotates about two axes for deflecting the beam to form the 2D raster.

9. The micromachined scanner of claim 8 wherein rotation of the mirror for deflecting the beam along a first axis of the 2D raster is energized by a force applied to the micromachined scanner electro-magnetically, and rotation of the mirror for deflecting the beam along a second axis of the 2D raster is energized by a force applied to the micromachined scanner electrostatically.

10. The scanner of claim 1 wherein the beam, as deflected by said first micromachined scanner, moves across the scanned surface parallel to a first axis of the 2D raster with a sinusoidal velocity.

11. The scanner of claim 1 wherein the beam, as deflected by said first micromachined scanner, has a first scanning frequency parallel to a first axis of the 2D raster, and has a second scanning frequency parallel to a second axis of the 2D raster, the scanning frequency along the first axis being greater by a fixed integer ratio than the scanning frequency along the second axis.

12. The scanner of claim 1 further comprise a second micromachined scanner, each micromachined scanner having a mirror that rotates about a single axis for deflecting the beam, rotation of the mirror of the first of the micromachined scanners deflecting the beam to form a first axis of the 2D raster, and rotation of the mirror of the second of the micromachined scanners deflecting the beam to form a second axis of the 2D raster.

13. The micromachined scanners of claim 12 wherein movements of the mirrors for deflecting the beam along both axes of the 2D raster are energized by forces respectively applied to the mirrors electro-magnetically.

14. The scanner of claim 1 wherein said radiation detector is selected from a group consisting of a photo-cell, a photo-diode, or an avalanche photo-diode.

15. The scanner of claim 1 wherein a patch secured to the block provides the scanned surface of said block touched by the human subject's finger.

16. The scanner of claim 15 wherein the patch is formed by a layer of resilient material secured to a harder material forming said block.

17. The scanner of claim 15 wherein the patch forming the scanned surface of said block is tinted to be transparent to electro-magnetic radiation at the pre-established wavelength, and to be less transparent to electro-magnetic radiation at wavelengths other than the pre-established wavelength.

18. The scanner of claim 1 wherein a resilient material forms the scanned surface of said block touched by the human subject's finger.

19. The scanner of claim 18 wherein the scanned surface of said block is tinted to be transparent to electro-magnetic radiation at the pre-established wavelength, and to be less transparent to electro-magnetic radiation at wavelengths other than the pre-established wavelength.

20. The scanner of claim 1 wherein said block, said radiation source, said first micromachined scanner, and said radiation detector are all enclosed within a housing having a volume that is no larger than twenty-one (21) cubic-centimeters ("$cm^3$"), and the scanned surface of said block that the human subject's finger touches having a surface area which is no smaller than three (3) square-centimeters ("$cm^2$").

21. The scanner of claim 1 wherein the block includes a lens of varying focus for maintaining a constant size for the beam throughout the 2D raster formed by the beam impinging on the scanned surface.

22. The scanner of claim 1 further comprising a controller for controlling operation of the scanner and including a fingerprint-data collection-unit for sampling fingerprint data from the time-varying electrical signal generated by the scanner, operation of the fingerprint-data collection-unit for sampling fingerprint data and operation of the controller for deflecting the beam along the 2D raster acquiring fingerprint data that are uniformly spaced along both axes of the 2D raster.

23. The scanner of claim 1 further wherein an image generated from fingerprint data obtained from the scanner depends only upon the time-varying electrical signal produced by the radiation detector, and upon beam-position signals supplied by said first micromachined scanner.

24. A compact, simplified scanner for generating a time-varying electrical signal that represents a fingerprint of a human subject, the scanner comprising:
  a housing that encloses a radiation source, a micromachined scanner, and a radiation detector, said housing providing a scanned surface that the human subject touches with a finger for which a representation of the fingerprint is to be generated, the scanned surface that the human subject's finger touches having a surface area which is no smaller than three (3) $cm^2$, and said housing occupying a volume that is no larger than twenty-one (21) $cm^3$.

25. A method for verifying an individual's identity comprising the steps of:
  pressing an authentication token against a scanned surface of a compact, simplified, image-building scanner that includes:
    a solid block formed from a material that is transparent to electro-magnetic radiation of a pre-established wavelength, said block including the scanned surface, said block also including a radiation inlet-face for admitting into said block a beam of electro-magnetic radiation having the pre-established wavelength, and said block further including a radiation outlet-face through which exits from said block at least a portion of electro-magnetic radiation admitted into said block through the radiation inlet-face, the radiation inlet-face and the radiation outlet-face of said block being distinct from the scanned surface thereof, said block being shaped so that the beam of electro-magnetic radiation entering through the radiation inlet-face impinges upon the scanned surface of said block before exiting from said block through the radiation outlet-face;
    a radiation source for emitting a beam of electro-magnetic radiation having the pre-established wavelength;
    a micromachined scanner having a mirror for deflecting the beam emitted from said radiation source, the beam of electro-magnetic radiation emitted by said radiation source impinging upon the mirror of said first micromachined scanner and being deflected thereby to form a two dimensional ("2D") raster of the beam, the 2D raster formed by the deflected beam emitted from said first micromachined scanner being directed into said block through the radiation inlet-face thereof, whereby the 2D raster of the beam impinges upon the scanned surface of said block; and
    a radiation detector which receives electro-magnetic radiation admitted into said block through the radiation inlet-face thereof, impinges upon the scanned surface of said block, and exits from said block through the radiation outlet-face thereof, said radiation detector being responsive to the received electro-magnetic radiation for producing a time-varying electrical signal that represents an item pressed against the scanned surface of said block;
    operating the scanner to obtain authentication-token by processing the time-varying electrical signal produced by the radiation detector to read the authentication token pressed against the scanned surface;
  touching the scanned surface of the scanner with a finger;
  operating the scanner to scan a fingerprint on the finger pressed against the scanned surface of the scanner to obtain fingerprint data from the time-varying electrical signal produced by the radiation detector; and
  comparing the authentication-token information with the fingerprint data to verify the individual's identity.

* * * * *